United States Patent
Bishel

(10) Patent No.: US 9,492,834 B1
(45) Date of Patent: Nov. 15, 2016

(54) ROBOTIC NOZZLE

(75) Inventor: Richard Anthony Bishel, Beaverton, OR (US)

(73) Assignee: Richard A Bishel, Beaverton, OR (US)

(*) Notice: Subject to any disclaimer, the term of this patent is extended or adjusted under 35 U.S.C. 154(b) by 943 days.

(21) Appl. No.: 12/589,023

(22) Filed: Oct. 15, 2009

(51) Int. Cl.
  B05B 17/08 (2006.01)

(52) U.S. Cl.
  CPC ..................... B05B 17/08 (2013.01)

(58) Field of Classification Search
  CPC ........................................... B05B 17/08
  USPC ............................... 239/17, 18, 71
  See application file for complete search history.

(56) References Cited

U.S. PATENT DOCUMENTS

| | | | |
|---|---|---|---|
| 871,191 A | 11/1907 | Southam | |
| 1,912,562 A | 6/1933 | Zynda | |
| 3,189,281 A * | 6/1965 | Booth | 239/17 |
| 3,292,861 A | 12/1966 | Kawamura et al. | |
| 3,294,322 A * | 12/1966 | Kawamura et al. | 239/17 |
| 3,318,528 A | 5/1967 | Williams | |
| 3,337,133 A | 8/1967 | Duerkob | |
| 3,461,457 A | 8/1969 | Kawamura et al. | |
| 3,503,554 A * | 3/1970 | Clifton | 239/23 |
| 3,542,292 A | 11/1970 | Chase | |
| 3,765,362 A * | 10/1973 | Gitchel | 114/144 A |
| 3,907,204 A | 9/1975 | Przystawik | |
| 4,352,215 A | 10/1982 | Laing | |
| 4,826,079 A | 5/1989 | Przystawik | |
| 4,838,310 A | 6/1989 | Scott et al. | |
| 4,844,341 A * | 7/1989 | Alba | 239/18 |
| 4,852,802 A | 8/1989 | Iggulden et al. | |
| 4,892,250 A | 1/1990 | Fuller et al. | |
| 4,936,506 A | 6/1990 | Ryan | |
| 4,948,046 A | 8/1990 | Przystawik | |
| 4,955,540 A | 9/1990 | Fuller et al. | |
| 4,962,522 A | 10/1990 | Marian | |
| 5,021,939 A | 6/1991 | Pulgiese | |
| 5,069,387 A | 12/1991 | Alba | |
| 5,078,320 A | 1/1992 | Fuller et al. | |
| 5,115,973 A * | 5/1992 | Fuller et al. | 239/20 |
| 5,115,974 A | 5/1992 | Tobias et al. | |
| 5,142,959 A | 9/1992 | Sakamoto et al. | |

(Continued)

FOREIGN PATENT DOCUMENTS

WO  WO 2004064498 A1  8/2004

OTHER PUBLICATIONS

Accurain, Inc, "AccuRain II Installation and Operation Guide," Website: www.accurain.com, 2005, pp. 1-27, Accurain, Inc., Oroville, CA, USA.

(Continued)

*Primary Examiner* — Ryan Reis

(57) ABSTRACT

A nozzle apparatus in a distributed system controls the nozzle in the desired direction using a position-controlled motor and is controlled by a computer with pre-recorded or preset patterns. The apparatus may be a fountain apparatus, a sprinkler apparatus, or a pool apparatus where the nozzles of these apparatuses emit a pressurized liquid such as water. The position-controlled motor can be an inexpensive hobby servo, or an elaborate self-contained control system with a servomotor, and a computer commands the desired position of the motor with preset patterns. The preset patterns may have music along with control information of the nozzles, valves, lights, and pumps. An aesthetic water display is produced from the overall systems.

10 Claims, 46 Drawing Sheets

(56) References Cited

U.S. PATENT DOCUMENTS

| | | |
|---|---|---|
| 5,152,210 A | 10/1992 | Chen |
| 5,270,480 A | 12/1993 | Hikawan |
| 5,280,854 A | 1/1994 | Das |
| 5,333,785 A | 8/1994 | Dodds et al. |
| 5,340,024 A | 8/1994 | Fuller et al. |
| 5,351,885 A | 10/1994 | Manabe |
| 5,366,157 A | 11/1994 | Pleasants |
| 5,390,858 A | 2/1995 | Watson |
| 5,524,822 A | 6/1996 | Simmons |
| 5,690,496 A | 11/1997 | Kennedy |
| 5,718,379 A | 2/1998 | Cramer |
| 5,836,522 A | 11/1998 | Przystawik |
| 5,918,809 A | 7/1999 | Simmons |
| 6,053,423 A * | 4/2000 | Jacobsen et al. ............... 239/18 |
| 6,075,195 A | 6/2000 | Gabai et al. |
| 6,276,612 B1 | 8/2001 | Hall |
| 6,336,596 B1 | 1/2002 | Katzman et al. |
| 6,357,058 B1 | 3/2002 | Biancamano |
| 6,375,090 B1 | 4/2002 | Beidokhti |
| 6,380,473 B2 | 4/2002 | Uehara |
| 6,402,048 B1 | 6/2002 | Collins |
| 6,611,114 B1 | 8/2003 | Yen |
| 6,702,687 B1 | 3/2004 | Henry |
| 6,717,383 B1 | 4/2004 | Brunt et al. |
| 6,782,310 B2 | 8/2004 | Bailey et al. |
| 6,834,814 B1 | 12/2004 | Beckman |
| 6,843,428 B2 | 1/2005 | Wooten et al. |
| 7,010,396 B2 | 3/2006 | Ware et al. |
| 7,051,952 B2 | 5/2006 | Drechsel |
| 7,179,173 B2 | 2/2007 | Henry et al. |
| 7,243,864 B2 * | 7/2007 | Trapp et al. ............... 239/587.2 |
| 7,349,763 B2 | 3/2008 | Ivans |
| 2002/0092411 A1 | 7/2002 | Shiiya |
| 2004/0020999 A1 | 2/2004 | Beidokhti |
| 2004/0089735 A1 | 5/2004 | Drechsel |
| 2006/0245599 A1 | 11/2006 | Regnier |
| 2007/0221750 A1 | 9/2007 | Roberts |
| 2008/0032806 A1 | 2/2008 | Henry et al. |

OTHER PUBLICATIONS

Erich Altvater, "Animated and Musical Fountains," Website: www.atlanticfountains.com, 2008, pp. 1-17, Atlantic Fountains LLC, Clinton, CT, USA.

Zach Anderson, "La Fontaine System Overview," Website: http://web.mit.edu/zacka/www/fountain.html, Publish: Feb. 2008, pp. 1-8, MIT Website, Cambridge, MA, USA.

* cited by examiner

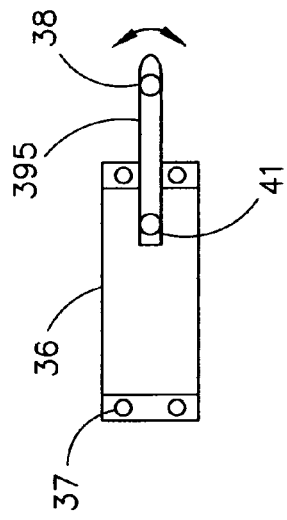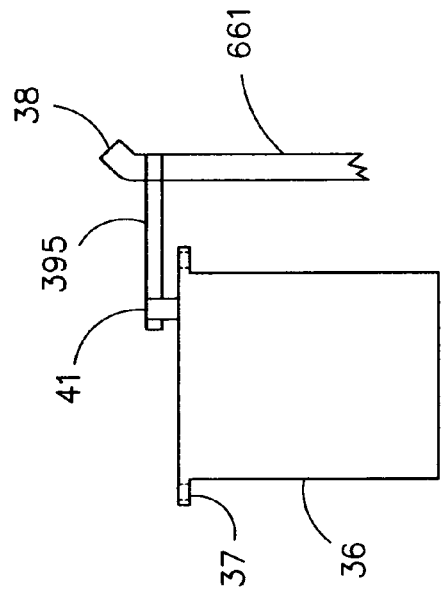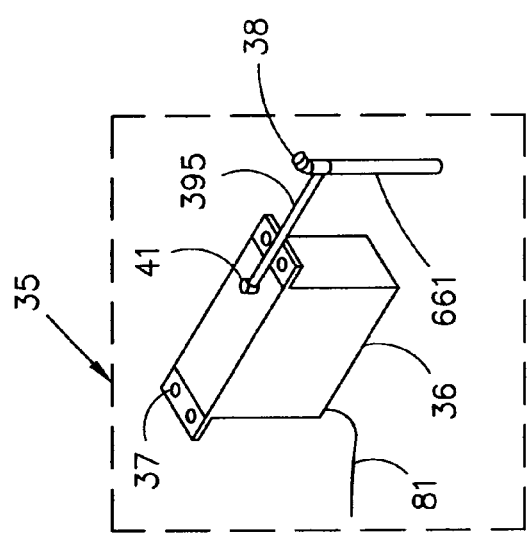
FIG. 4B
FIG. 4C
FIG. 4A

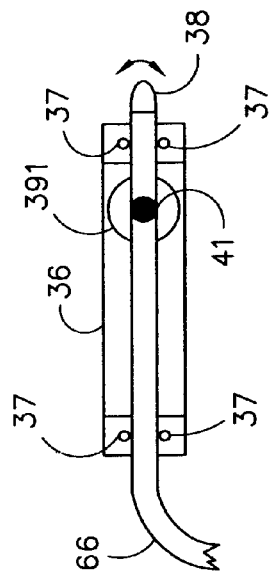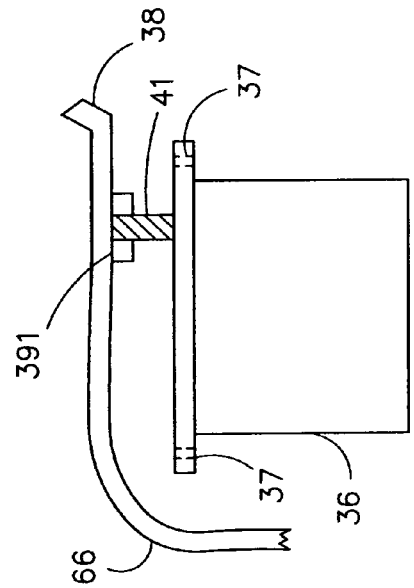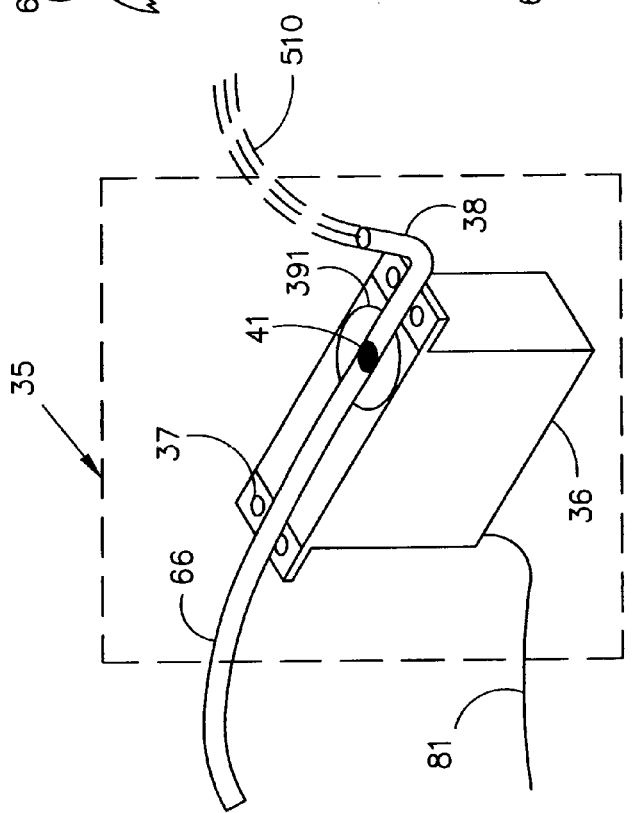

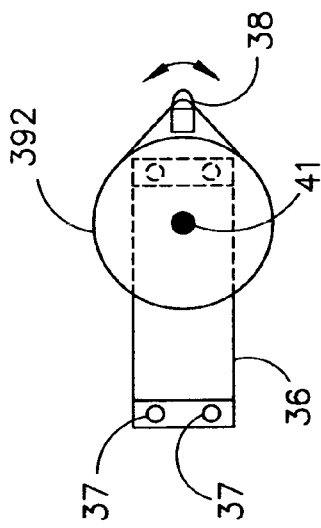
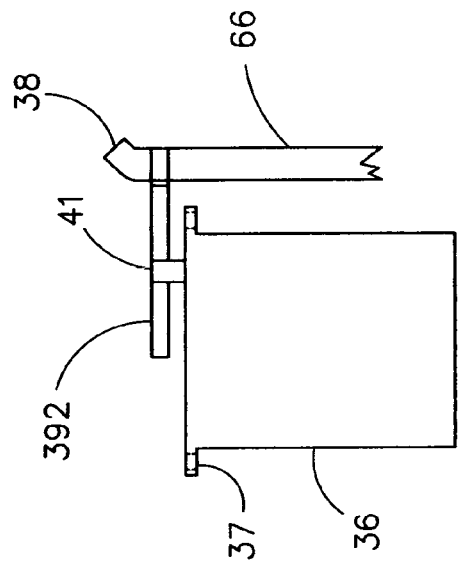
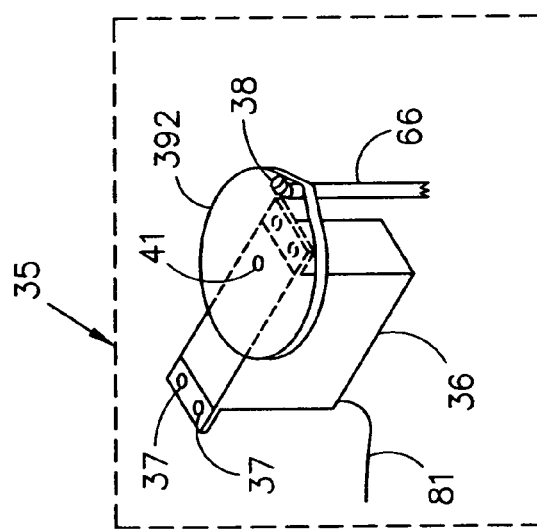

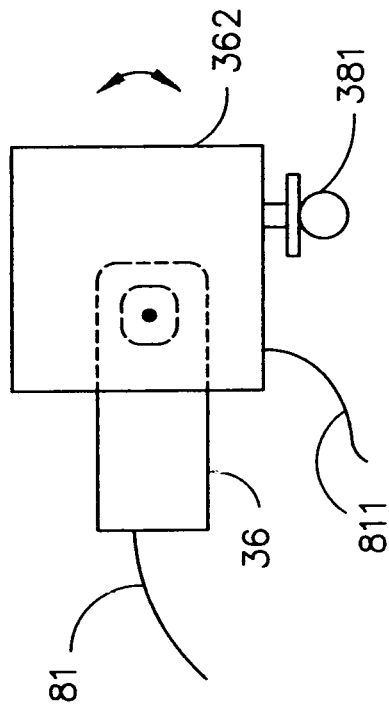
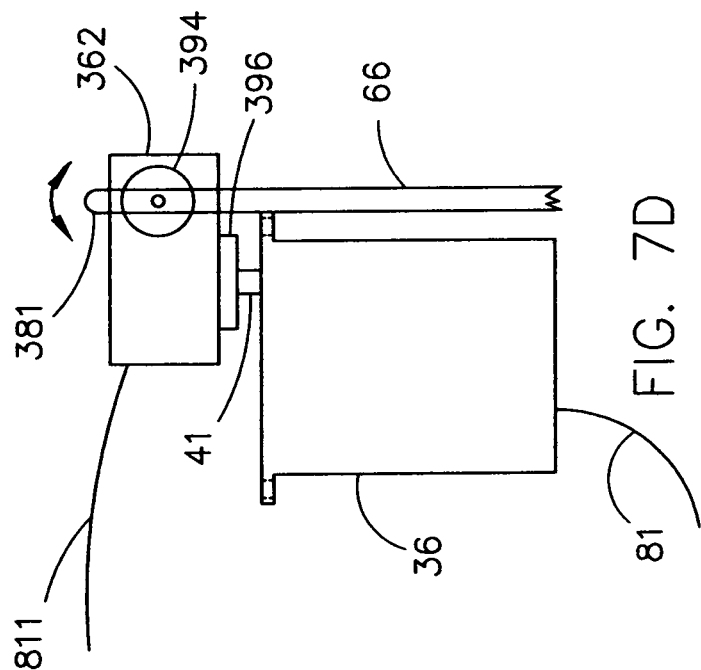

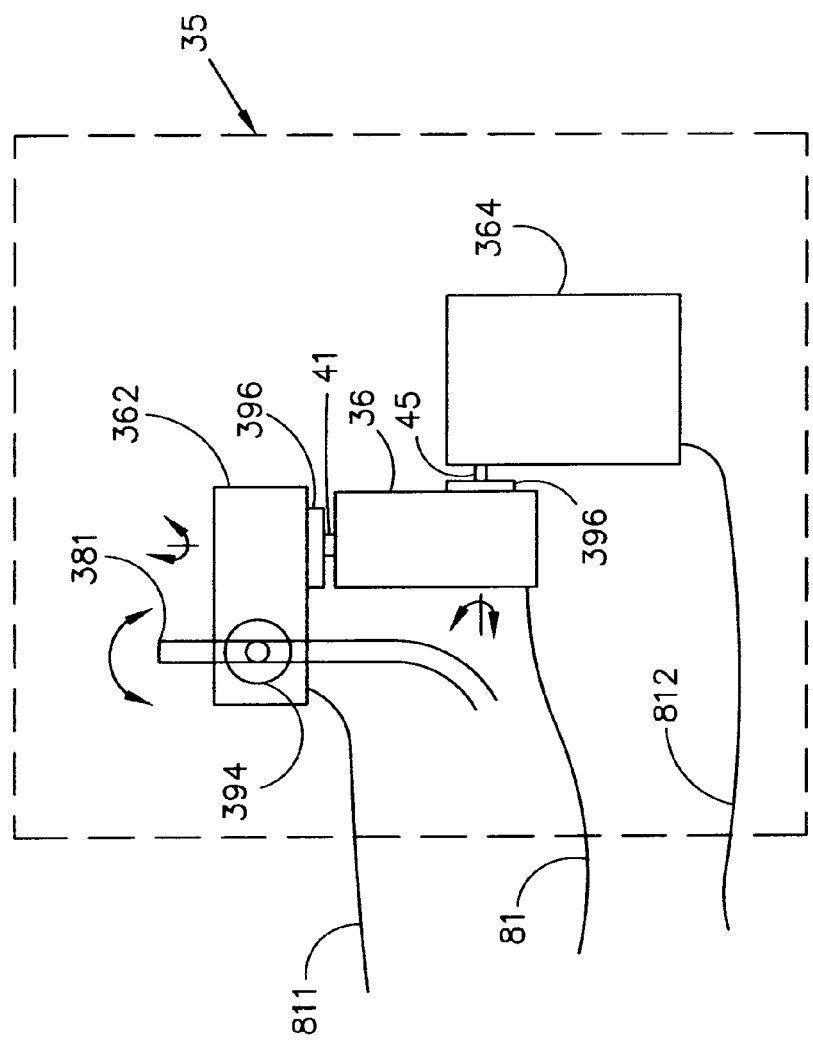

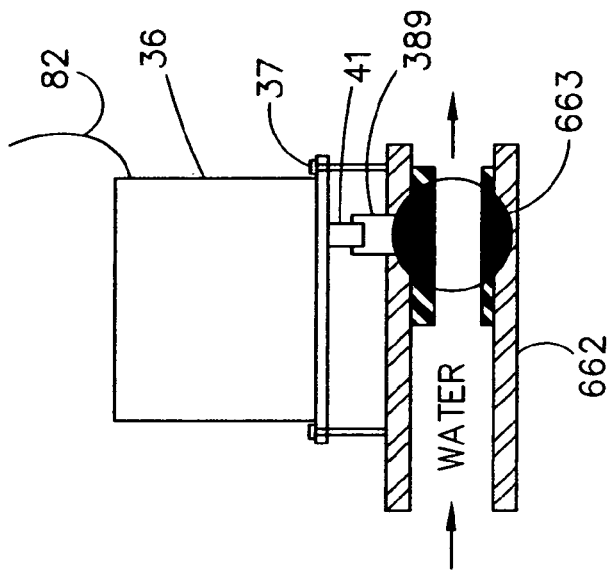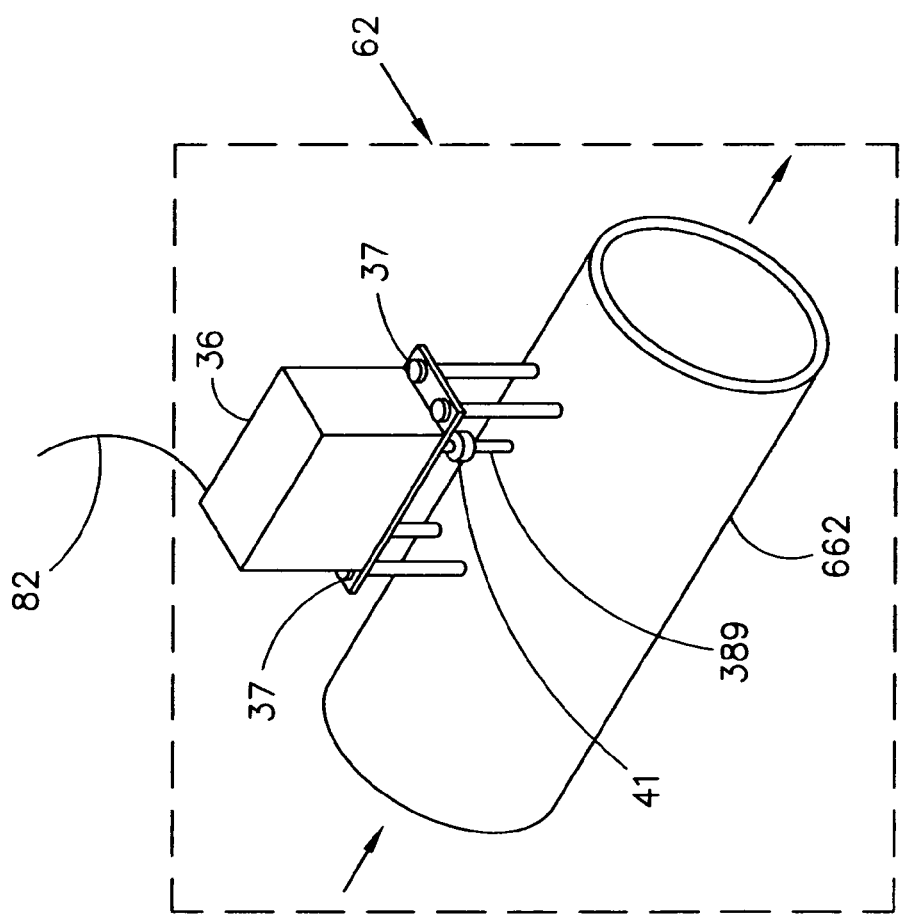

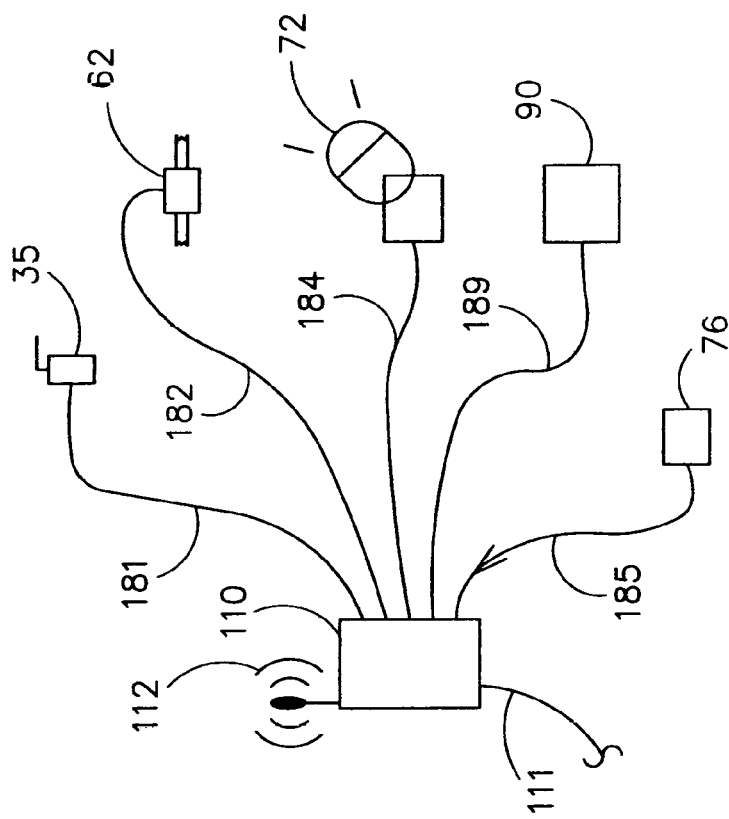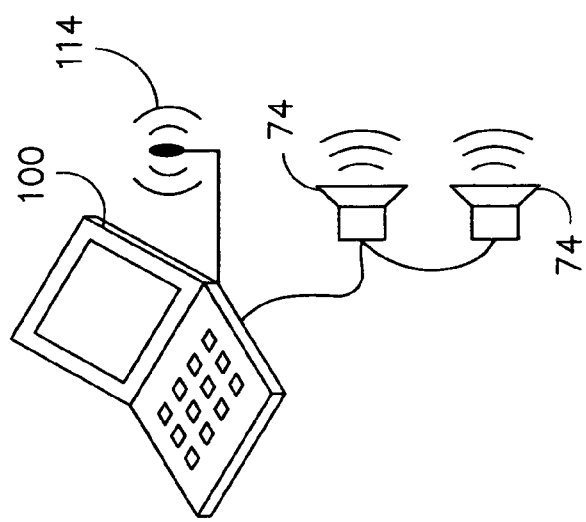
FIG. 9A

| Octave | C | C# | D | E♭ | E | F | F# | G | G# | A | B♭ | B |
|---|---|---|---|---|---|---|---|---|---|---|---|---|
| -1 | 00(000) | 01(001) | 02(002) | 03(003) | 04(004) | 05(005) | 06(006) | 07(007) | 08(008) | 09(009) | 0A(010) | 0B(011) |
| 0 | 0C(012) | 0D(013) | 0E(014) | 0F(015) | 10(016) | 11(017) | 12(018) | 13(019) | 14(020) | 15(021) | 16(022) | 17(023) |
| 1 | 18(024) | 19(025) | 1A(026) | 1B(027) | 1C(028) | 1D(029) | 1E(030) | 1F(031) | 20(032) | 21(033) | 22(034) | 23(035) |
| 2 | 24(036) | 25(037) | 26(038) | 27(039) | 28(040) | 29(041) | 2A(042) | 2B(043) | 2C(044) | 2D(045) | 2E(046) | 2F(047) |
| 3 | 30(048) | 31(049) | 32(050) | 33(051) | 34(052) | 35(053) | 36(054) | 37(055) | 38(056) | 39(057) | 3A(058) | 3B(059) |
| 4 | 3C(060) | 3D(061) | 3E(062) | 3F(063) | 40(064) | 41(065) | 42(066) | 43(067) | 44(068) | 45(069) | 46(070) | 47(071) |
| 5 | 48(072) | 49(073) | 4A(074) | 4B(075) | 4C(076) | 4D(077) | 4E(078) | 4F(079) | 50(080) | 51(081) | 52(082) | 53(083) |
| 6 | 54(084) | 55(085) | 56(086) | 57(087) | 58(088) | 59(089) | 5A(090) | 5B(091) | 5C(092) | 5D(093) | 5E(094) | 5F(095) |
| 7 | 60(096) | 61(097) | 62(098) | 63(099) | 64(100) | 65(101) | 66(102) | 67(103) | 68(104) | 69(105) | 6A(106) | 6B(107) |
| 8 | 6C(108) | 6D(109) | 6E(110) | 6F(111) | 70(112) | 71(113) | 72(114) | 73(115) | 74(116) | 75(117) | 76(118) | 77(119) |
| 9 | 78(120) | 79(121) | 7A(122) | 7B(123) | 7C(124) | 7D(125) | 7E(126) | 7F(127) | | | | |

Notes/Numbers

FIG. 11A

| Hex | Decimal | Controller | Data Range |
|---|---|---|---|
| 00 | 0 | Bank Select ( MSB ) | 00-7f ( 0 -127 ) |
| 01 | 1 | Modulation Wheel ( MSB ) | 00-7f ( 0 -127 ) |
| 02 | 2 | Breath Control ( MSB ) | 00-7f ( 0 -127 ) |
| 03 | 3 | Continuous Controller #3 | 00-7f ( 0 -127 ) |
| 04 | 4 | Foot Controller ( MSB ) | 00-7f ( 0 -127 ) |
| 05 | 5 | Portamento Time ( MSB ) | 00-7f ( 0 -127 ) |
| 06 | 6 | Data Entry Slider ( MSB ) | 00-7f ( 0 -127 ) |
| 07 | 7 | Main Volume ( MSB ) | 00-7f ( 0 -127 ) |
| 08 | 8 | Stereo Balance ( MSB ) | 00-7f ( 0 -127 ) |
| 09 | 9 | Continuous Controller #9 | 00-7f ( 0 -127 ) |
| 0A | 10 | Pan ( MSB ) | 00-7f ( 0 -127 ) |
| 0B | 11 | Expression ( MSB ) | 00-7f ( 0 -127 ) |
| 0C | 12 | Effect Controller 1 ( MSB ) | 00-7f ( 0 -127 ) |
| 0D | 13 | Effect Controller 2 ( MSB ) | 00-7f ( 0 -127 ) |
| 0E | 14 | Continuous Controller #14 | 00-7f ( 0 -127 ) |
| 0F | 15 | Continuous Controller #15 | 00-7f ( 0 -127 ) |
| 10 | 16 | General Purpose Slider Control 1 | 00-7f ( 0 -127 ) |
| 11 | 17 | General Purpose Slider Control 2 | 00-7f ( 0 -127 ) |
| 12 | 18 | General Purpose Slider Control 3 | 00-7f ( 0 -127 ) |
| 13 | 19 | General Purpose Slider Control 4 | 00-7f ( 0 -127 ) |
| 14 | 20 | Continuous Controller #20 | 00-7f ( 0 -127 ) |
| 15 | 21 | Continuous Controller #21 | 00-7f ( 0 -127 ) |
| 16 | 22 | Continuous Controller #22 | 00-7f ( 0 -127 ) |
| 17 | 23 | Continuous Controller #23 | 00-7f ( 0 -127 ) |
| 18 | 24 | Continuous Controller #24 | 00-7f ( 0 -127 ) |
| 19 | 25 | Continuous Controller #25 | 00-7f ( 0 -127 ) |
| 1A | 26 | Continuous Controller #26 | 00-7f ( 0 -127 ) |
| 1B | 27 | Continuous Controller #27 | 00-7f ( 0 -127 ) |
| 1C | 28 | Continuous Controller #28 | 00-7f ( 0 -127 ) |
| 1D | 29 | Continuous Controller #29 | 00-7f ( 0 -127 ) |
| 1E | 30 | Continuous Controller #30 | 00-7f ( 0 -127 ) |
| 1F | 31 | Continuous Controller #31 | 00-7f ( 0 -127 ) |

FIG. 11B

| CHANNEL #54 | |
|---|---|
| T0 | NOTE ON |
| | PWM 35 20° |
| | LIGHT #72 OFF |
| T1 | NOTE OFF |
| | PWM 35 25° |
| | LIGHT #72 OFF |
| T2 | NOTE 2 ON |
| | PWM 35 30° |
| | LIGHT #72 ON |
| T3 | NOTE 2 OFF |
| | PWM 35 35° |
| | LIGHT #72 ON |
| T4 | NOTE 3 ON |
| | PWM 35 35° |
| | LIGHT #72 OFF |
| T5 | ... |

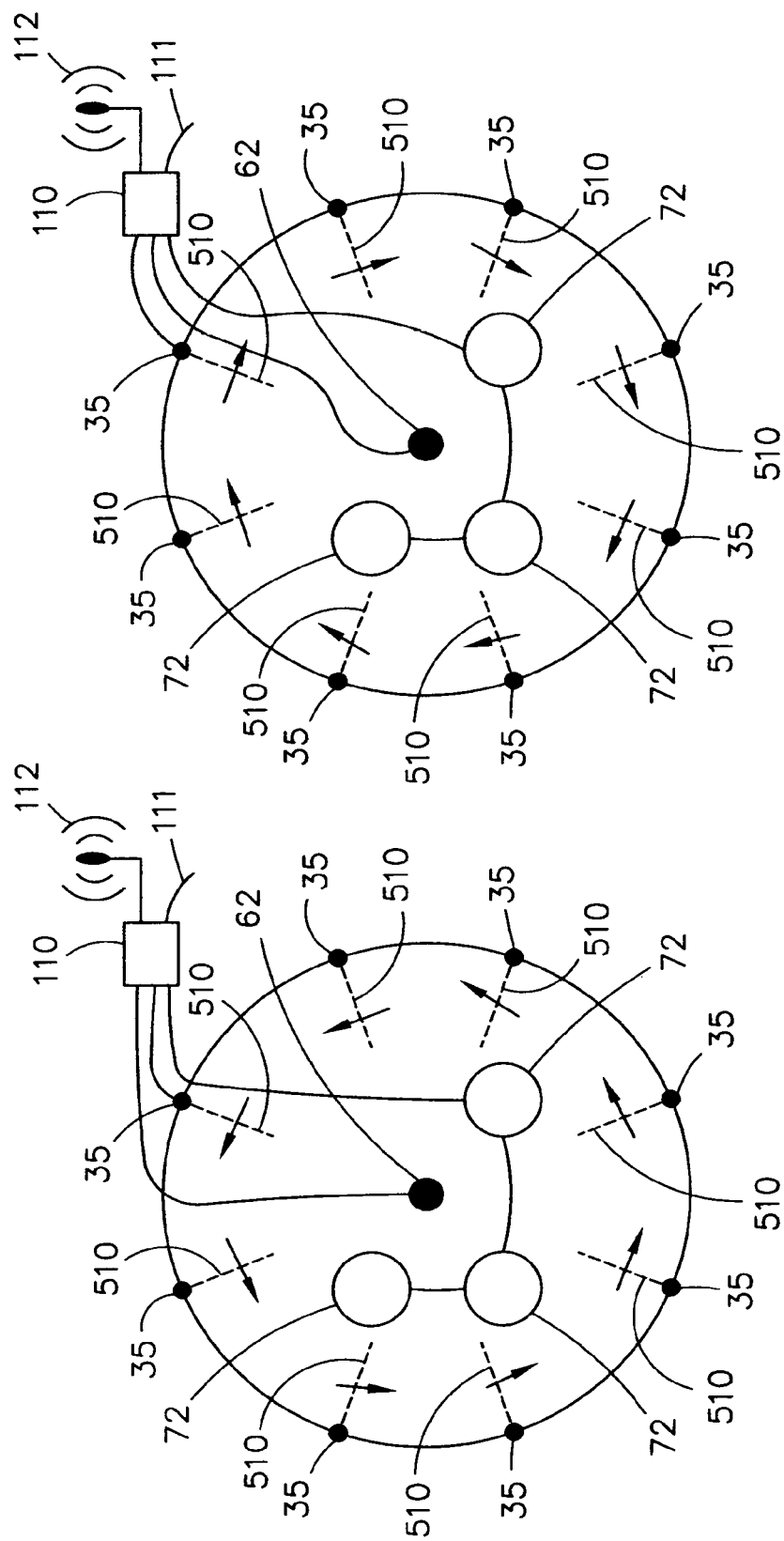

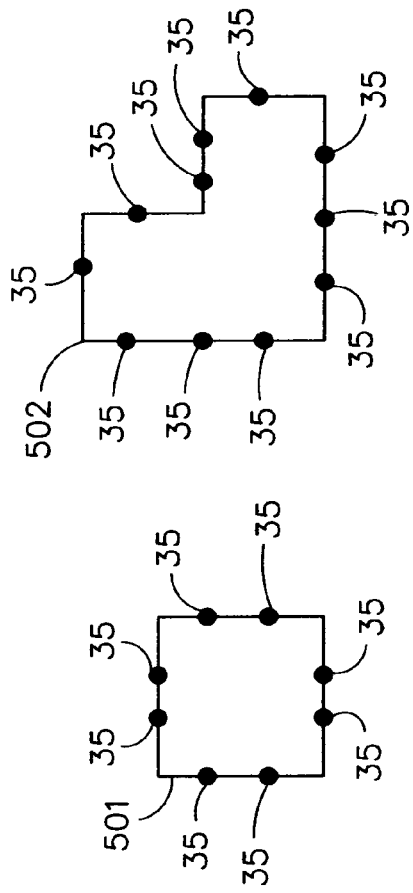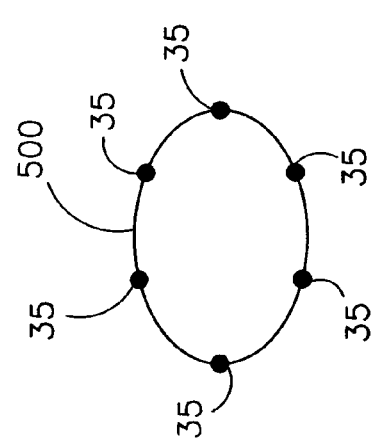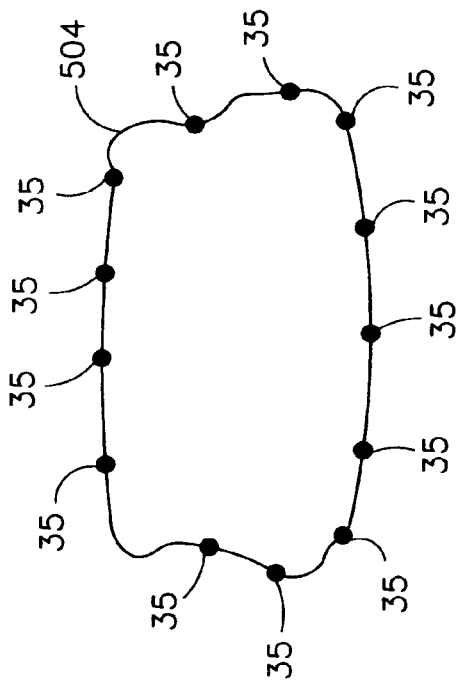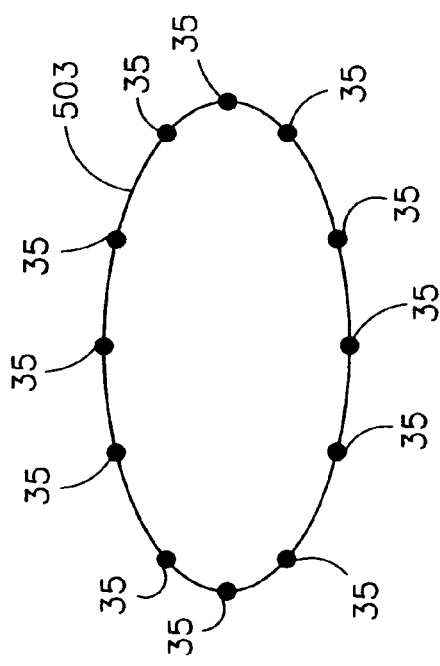

ROBOTIC NOZZLE

RELATED APPLICATIONS

The Patent application claims priority of Provisional Application No. 61/196,166, filed on Oct. 15, 2008, the entirety of which is incorporated by reference herein.

TECHNICAL FIELD

The disclosure relates generally but not exclusively to water fountains, sprinkler systems, and pool systems that utilize liquid in an aesthetic manner.

BACKGROUND

Nozzles are used in many applications such as sprinkler systems, irrigation systems, fountains, faucets, pools, spas, etc. In the majority of these applications, the nozzle is stationary and does not move. In some applications, such as the sprinkler or irrigation systems, the water drives the nozzle in a rotational motion.

Nozzles for water fountains have been around for centuries where the fountains add to the landscape and architecture. In the past decades, controlling the lighting, the sound, and water flow has been added to enhance the appeal of fountains. U.S. Pat. No. 3,907,204 by Przystawik discloses a mechanical arrangement to have the nozzles using a single motor. For different spray patterns, a mechanical linkage needs to be changed. U.S. Pat. No. 5,078,320 by Fuller shows a hydraulic-controlled motor to position a laminar flow nozzle at different angles. U.S. Pat. No. 6,053,423 by Jacobsen et al. discloses an automated control system to control a nozzle and lights in two degrees of freedom. The servo-motors and automated control system are very sophisticated and complex systems. The servo-motors, the valves, the piping, components, and automated control system are very expensive. Furthermore, the Jacobsen system requires significant effort to re-program and to choreograph the nozzles with the music. The most famous application of this system is the water show at the Bellagio Hotel & Casino in Las Vegas, Nev. These water shows give a pleasing effect when the water fountains are synchronized to each other and to the music. U.S. Pat. No. 6,276,612 B1 by Hall discloses a fountain control system which controls variable speed pumps with an incoming audio signal, but no control of the position of the nozzle is disclosed.

Nozzles for sprinklers exist in all kinds of construction, sizes, and mechanisms. There are "pop-up" rotary nozzles used in sprinkler system which are contained in a housing unit buried in the ground which pop-up when water pressure is applied. A majority of these sprinklers use water pressure to move the sprinkler nozzle. With these systems, there is a very limited flexibility to modify the flow rate or sprinkler nozzle. Once the sprinkler system is installed, the sprinkler nozzle needs to be replaced or manually adjusted to provide different patterns or water rate to certain areas. Also, with a rotary sprinkler mechanism, the sprinkler patterns are not synchronized and do not provide an esthetic appearance when the sprinklers are on.

U.S. Pat. No. 5,280,854 by Das shows a single robotic sprinkler head controlled by a computer to replace current underground pipes and sprinklers. Das discloses replacing a current distributed concept with a single unit. U.S. Pat. No. 6,336,596 B1 by Katzman et al. discloses an electrically operated sprinkler to replace the existing rotary sprinkler driven by water flow by electrical motors to allow full water pressure to be used. Katzman et al. uses a multiple toothed wheels which may be synchronized between the two internal motors using a mechanical camroler to obtain a specific pattern. There is no computer to control the sprinkler pattern or synchronize the different sprinkler heads together. U.S. Pat. No. 7,051,952 B2 by Drechsel shows an irrigation water nozzle controlled by a jet interrupter and diverter arm. Drechsel discloses a single unit controlled by computer to irrigate a plant field. U.S. Pat. No. 6,402,048 by Collins discloses stepper motors controlled by a pre-programmed microprocessor to position the sprinkler nozzle at the desired position. There is no central control of position of the sprinkler nozzle, but individual control with external programming tools for providing information. Therefore, there can be no synchronization of the different sprinkler nozzles. U.S. Patent Application 2007/022,1750 A1 by Roberts discloses a microprocessor-controlled motor/solenoid combination where the motor rotates the nozzle in a given direction and the solenoid controls the flow rate to the nozzle base on nozzle position. There is no position control of the motor and no way of synchronizing the position of different sprinkler nozzles.

SUMMARY OF DISCLOSURE

An apparatus in a distributed system comprises a nozzle and a position-controlled electric motor. The position-controlled electric motor is attached to the nozzle to control a direction in which the nozzle emits a pressurized liquid. The computer, which is connected via a wired or wireless to the position-controlled motor, is configured to provide position-controlled motor one or more position signals based on one or more patterns. The apparatus may be, for example, a fountain apparatus, a sprinkler apparatus, or a pool apparatus. The position-controlled electric motor may be, for example, a hobby servo, a stepper motor with dedicated control system, or a servo motor with a dedicated control system. Optionally, the apparatus may further comprise an adjustable valve to vary the pressure of said pressurized liquid delivered to said nozzle. The computer may be, for example, a Personal Computer, a dedicated computer, or an embedded computer. The apparatus may optionally further comprise a sound system capable of producing music synchronized with motion of the nozzle and/or a software program denoted as a MIDI sequencer to control one or more of music, lights, valves, or nozzles in the distributed system.

In another respect, an apparatus in a distributed system comprises a nozzle having a direction in which a pressurized liquid is emitted and a hobby servo attached to said nozzle to control the direction of said nozzle. The apparatus may be, for example, a fountain apparatus, a sprinkler apparatus, or a pool apparatus. The apparatus may optionally comprise means associated with the pressurized liquid to varying the pressure to said nozzle and/or a computer which controls the direction of the nozzle. The apparatus may also optionally comprise a sound system capable of producing music synchronized with movement of the nozzle and/or a software program denoted as a MIDI sequencer use to control music, lights, valves, or nozzles.

A fountain system comprise a plurality of position-controlled nozzles through which flows a pressurized liquid and a controller configured to synchronize motion of said nozzles with a preset program. The controller may be or comprise, for example, a computer, PC, a dedicated computer, or an embedded computer. The preset program may, in one embodiment, be stored control and music information.

A sprinkler apparatus in a distributed system comprises an inlet water pipe connected to water under pressure, an outlet water nozzle, and a position-controlled electric motor for rotating said nozzle to a desired position based on said received control signals. The position-controlled electric motor may be, for example, a hobby servo, a stepper motor with dedicated control system, or a servo motor with a dedicated control system. The apparatus may optionally further comprise one or more of the following: means associated with the pressurized liquid to varying the pressure to said nozzle; a computer which controls the direction of the nozzle via transmitted control signals; a sound system capable of producing music synchronized with motion of the nozzle; and/or a software program denoted as a MIDI sequencer use to control music, lights, valves, or nozzles.

A sprinkler system in a distributed system comprises a water feed line, a plurality of sprinkler control heads, and a control means for synchronizing the said sprinkler control heads.

A method operates a nozzle that emits pressurized water. The method create an electric signal encoding angular position information and provide the electric signal to a position-controlled electric motor attached to the nozzle, thereby controlling a direction in which the nozzle emits the pressurized water. The method may also optionally play music in coordination with motion of the nozzle. The method may also optionally illuminate one or more lights in coordination with motion of the nozzle.

In yet another respect, an apparatus comprises a means for emitting a pressurized liquid in a given direction, a means for controlling the given direction in response to an open-loop position control signal, and a means for generating a sequence of the open loop position control signals so as to cause desired motion of the means for emitting while emitting the pressurized liquid. By way of example and not limitation, the means for emitting a pressurized liquid in a given direction may be any of the nozzles described herein, the means for controlling the given direction in response to an open-loop position control signal may be any of the motors and/or servos described herein, and the means for generating a sequence of the open loop position control signals so as to cause desired motion of the means for emitting while emitting the pressurized liquid may be any of the computers with the software programs or patterns described herein.

LIST OF FIGURES

FIG. 4A is an isometric view of one embodiment of the apparatus where the nozzle is attached with an arm.

FIG. 4B is a top view of one embodiment of the apparatus where the nozzle is attached with an arm.

FIG. 4C is a side view of one embodiment of the apparatus where the nozzle is attached with an arm.

FIG. 5A is an isometric view of one embodiment of the apparatus where the nozzle is attached in horizontal direction.

FIG. 5B is a top view of one embodiment of the apparatus where the nozzle is attached in horizontal direction.

FIG. 5C is a side view of one embodiment of the apparatus where the nozzle is attached in horizontal direction.

FIG. 6A is an isometric view of one embodiment of the apparatus where the nozzle is attached in vertical direction with circular fixture.

FIG. 6B is a top view of one embodiment of the apparatus where the nozzle is attached in vertical direction with circular fixture.

FIG. 6C is a side view of one embodiment of the apparatus where the nozzle is attached in vertical direction with circular fixture.

FIG. 7D is a side view of an apparatus with two position-controlled motors mounted closely together.

FIG. 7E is a top view of an apparatus with two position-controlled motors mounted closely together.

FIG. 7F is a side view of an apparatus with three position-controlled motors.

FIG. 8A is an isometric view of the valve controlled by a position-controlled motor.

FIG. 8B is a detailed side view of the valve controlled by a position-controlled motor.

FIG. 9A show an embodiment of the system components with a wireless connection between the computer and the converter.

FIG. 11A is a table of standard digital MIDI data for music notes.

FIG. 11B is a table of standard control messages in the MIDI standard.

FIG. 12B shows a single channel of data for controlling instruments and components.

FIG. 15A is a top view of components in an application of with one set pattern.

FIG. 15B is a top view of components in an application with another set pattern.

FIG. 17A is a top view of the placements of the apparatuses in a circular arrangement.

FIG. 17B is a top view of the placements of the apparatuses in a square arrangement.

FIG. 17C is a top view of the placements of the apparatuses in a rectangular arrangement.

FIG. 17D is a top view of the placements of the apparatuses in an elliptical arrangement.

FIG. 17E is a top view of the placements of the apparatuses in a free-form arrangement.

DESCRIPTION OF EMBODIMENTS

With reference to the above-listed drawings, this section describes particular embodiments and their detailed construction and operation. The embodiments described herein are set forth by way of illustration only and not limitation. Those skilled in the art will recognize in light of the teachings herein that there is a range of equivalents to the example embodiments described herein. Most notably, other embodiments are possible, variations can be made to the embodiments described herein, and there may be equivalents to the components, parts, or steps that make up the described embodiments.

As one skilled in the art will appreciate in light of this disclosure, certain embodiments are capable of achieving certain advantages over the known prior art, including some or all of the following: (1) providing a small-scale (e.g., residential) sprinkler or fountain system with an entertainment effect to give a pleasing effect similar to sophisticated Las Vegas water shows, which are not practical or affordable for a majority of applications; (2) avoiding the expense of a sophisticated fountain system; (3) avoiding the hardship of creating choreographed songs for use with a sophisticated fountain system; (4) enabling use of inexpensive and easy-to-operate parts with a fountain or sprinkler system, such parts including, for example, position-controlled motors such as hobby servos or the like and MIDI music software; and (5) providing flexibility to position a nozzle in a sprinkler or fountain system. These and other advantages of various embodiments will be apparent upon reading the remainder of this section.

For the sake of clarity and conciseness, certain aspects of components or steps of certain embodiments are presented without undue detail where such detail would be apparent to those skilled in the art in light of the teachings herein and/or where such detail would obfuscate an understanding of more pertinent aspects of the embodiments.

Figure 1:
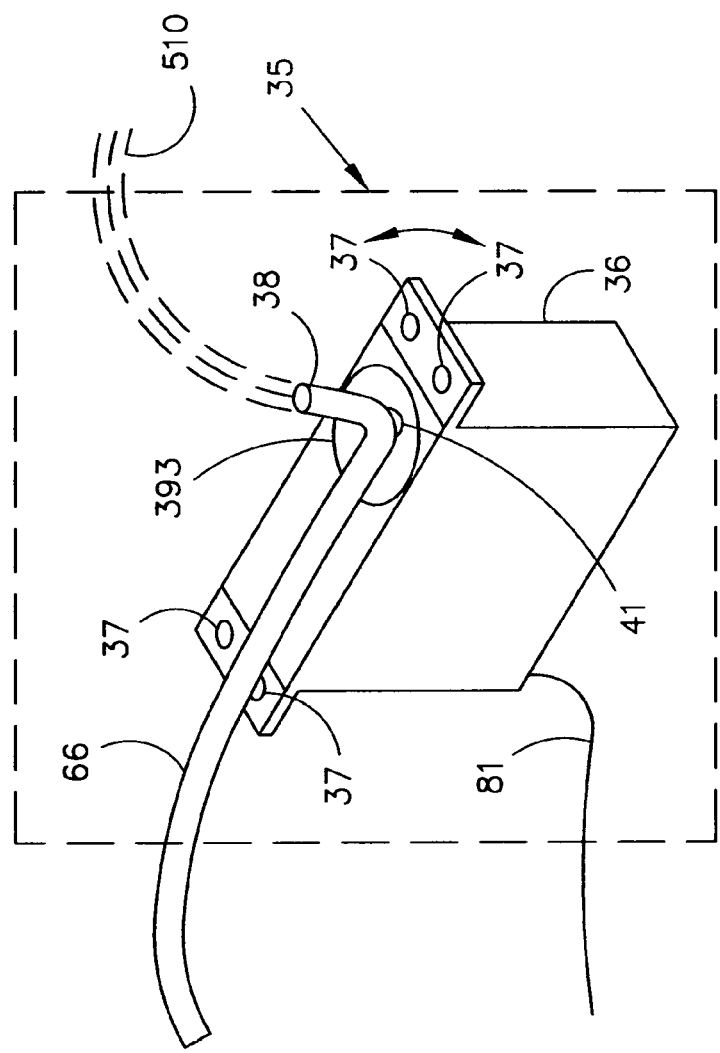
FIG. 1 is a detailed perspective view of the apparatus.

FIG. 1 shows a preferred embodiment for a nozzle apparatus 35 utilizing a position-controlled motor 36, a nozzle 38, an attachment mechanism 393, a pressurized liquid in substantially flexible pipe or hose 66, mounting arrangement 37, and power and communication wire(s) or link 81. Only one link 81 is shown for clarity but a single or multiple wires may be employed. A pressurized fluid 510 such as water goes through the hose 66 and exits out the nozzle 38. The direction of the fluid 510 is controlled by the position-controlled motor 36 over 180 to 360 degrees from the center of the gear 41 via the attachment mechanism 393 and nozzle 38. The attachment mechanism 393 connects the output of the position-controlled motor 36 with the nozzle 38. The direction signal information and power for the position-controlled motor 36 is via the communication link 81.

Figure 2:
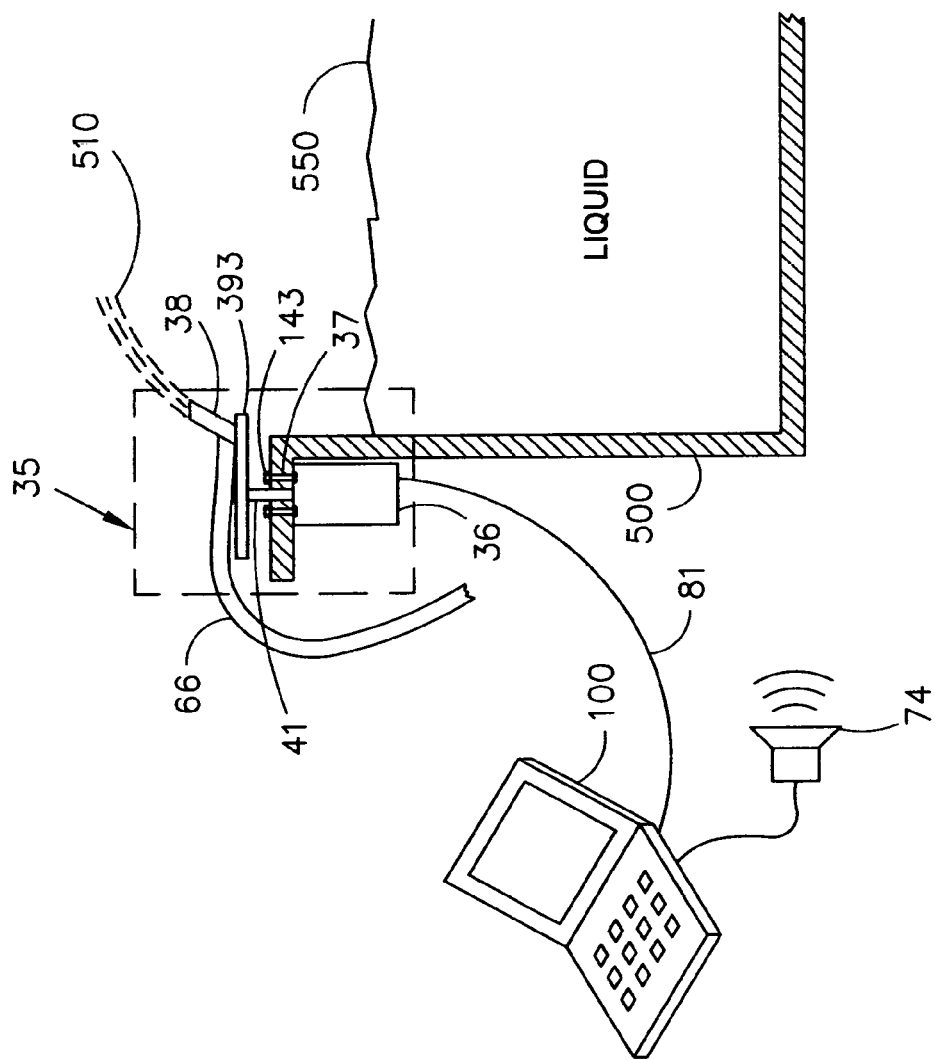
FIG. 2 is a detailed view of the apparatus in one application.

FIG. 2 shows the attachment of the nozzle apparatus 35 connected to a basin 500 and a programmable computer 100. The basin 500 can be a plastic container, a fiberglass structure, a pool structure, a concrete or brick structure or any type of fountain structure. In FIG. 2, the nozzle apparatus 35 is fasten to the basin 500 via fasteners 143 such as threaded bolt, washer, and locknut in this embodiment to the position-controlled motor 36 via the mounting arrangement 37. In other embodiments, any numerous other alternative fastening mechanisms can be employed. Examples of such alternate fastening mechanisms include but are not limited to welding, adhesive bonding, riveting, nailing, screwing, external clamping, etc. The pressurized fluid 510 is provided via the hose 66 by a water source such as pump. In this example, the direction of the nozzle 38 is controlled in this example to 180 degree movement around the gear 41 center. The position-controlled motor 36 controls the direction of the nozzle 38. The position-controlled motor 36 is defined as a self-contained motor/sensor/controller system with a motor, sensor feedback, amplifier or driver, and control circuitry. The computer 100 sends position commands via a wired communication link 81 to the position-controlled motor 36 which is a self-contained control system. The position-controlled motor control system drives the motor to the desired commanded position and achieves this with internal feedback. The position-controlled motor 36 reduces the complexity of the overall system. Some examples of the position-controlled motor 36 are a hobby servo, a stepper motor with a dedicated control system, or a servo motor with a dedicated control system. Some manufacturers of the hobby servos are Traxxas of Plano, Tex., Futaba of Champaign, Ill., Hitec of Poway, Calif., Airtronics of Fountain Valley, Calif., and JR Radios of Champaign, Ill. The position information is transmitted to the position-controlled motor 36 by a protocol such as Radio-Controlled pulse-wide modulation, RC PWM, as in the hobby servo example. Other protocols can be used. The programmable computer 100, such as laptop PC, a desktop PC, or embedded PC, contains pre-set patterns or previously recorded patterns for controlling the attached components. For example, as used herein, the term "computer" is defined as a machine that manipulates data according to a set of instructions. For example, pre-set patterns can control the direction of the position-controlled motor 36 via the electrical communication link 81 from the computer 100. Optionally, the computer 100 can control the position-controlled motor 36 in synchronization with music from a speaker 74. In this embodiment the pre-set patterns and the music may be located on the computer 100 as a software computer program.

Figure 3A:
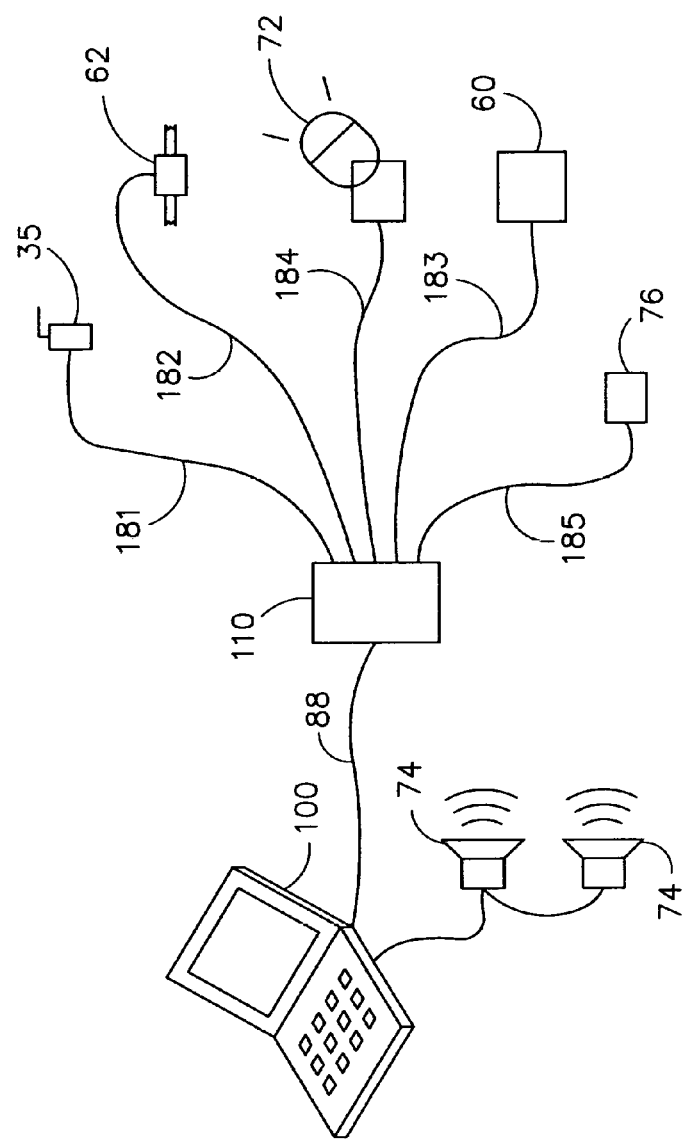
FIG. 3A is a block diagram of the components of the system in one embodiment.

FIGS. 3A, 3B, 3C, and 3D show one embodiment of the fountain system utilizing the nozzle apparatus 35. In FIG. 3A, the components are shown with the computer 100. The computer 100 drives a converter 110 via a wire communication link 88 which can be any protocol for communicating between two electronic devices such as USB (Universal Serial Bus), MIDI (Musical Instrument Digital Interface), RC (Radio-Controlled) signals, RS485 (Recommended Standard 485), RS232 (Recommended Standard 232), Ethernet . . . etc. The computer 100 has the preset patterns for the nozzle apparatus 35, the valves 62, the lights 72, the pump 60, and other input/output components 76 in synchronization with the music which is played out on the stereo speakers 74. The converter 110 changes the protocol from the computer such as MIDI, Musical Instrument Digital Interface, to a protocol to drive the components such as PWM. Some examples of the converter 110 are MIDI 1.2 unit from Yost Engineering, Inc. of Portsmith, Ohio, SRV-4 unit from J-Omega Electronics from United Kingdom, or MD24 MIDI Decoder from Highly Liquid of Columbus, Ohio. The converter 110 controls the nozzle apparatus 35 via electrical lines 181, the valves 62 via electrical lines 182, the lights 72 via electrical lines 184, the pump 60 via electrical lines 183, and the input/output devices 76 via electrical lines 185.

Figure 3B:
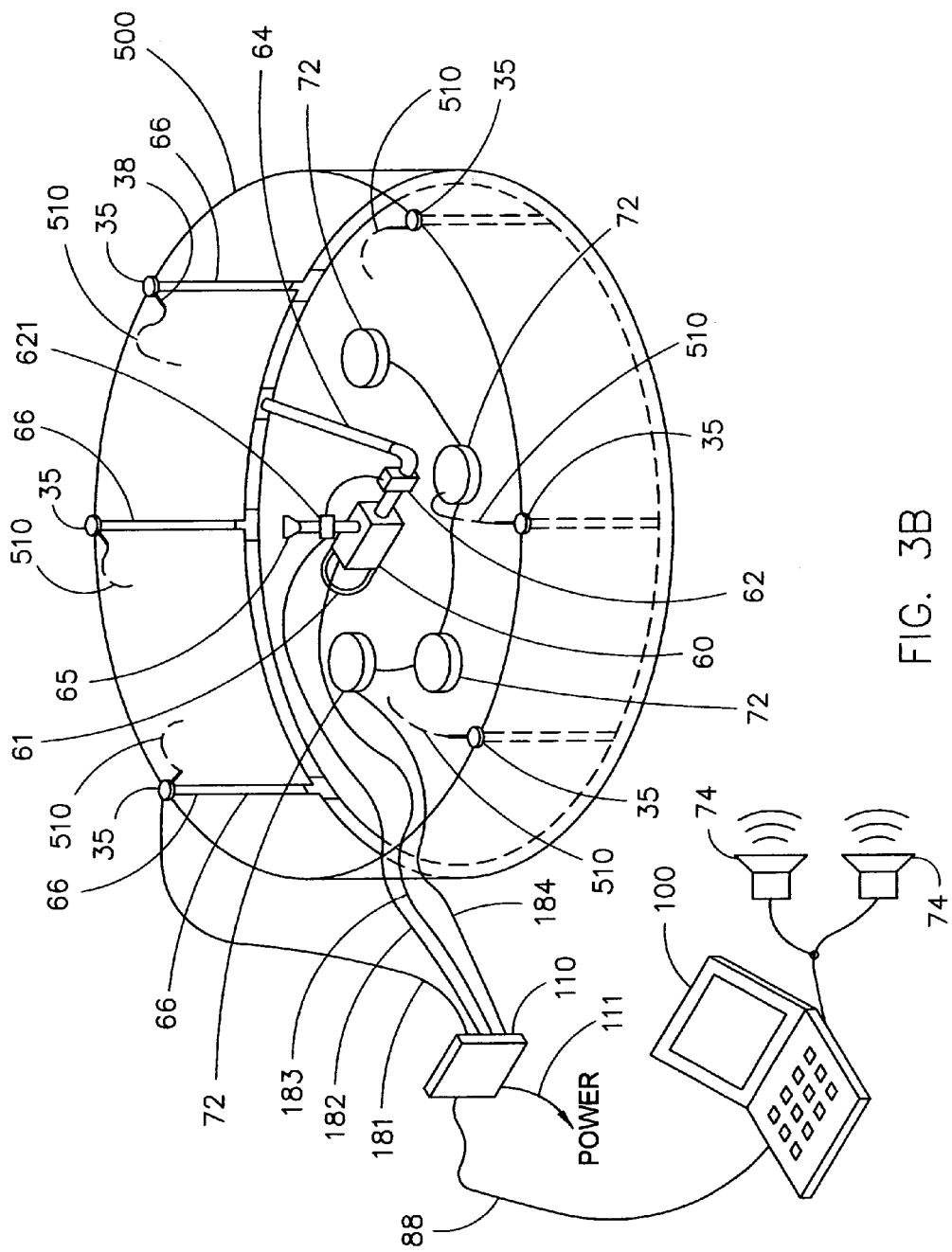
FIG. 3B is a detailed perspective view of the components of the system in an application.

FIG. 3B shows the components of FIG. 3A with the basin 500 to form a fountain system. The basin 500 contains several nozzle apparatuses 35 which are distributed around the basin 500, controllable lights 72, a water pump 60, and controllable valves 62 and 621. Each nozzle apparatus 35 provides a liquid stream 510 from the hose 66 and each nozzle apparatus 35 is controlled by the computer 100 via the converter 110 and electrical lines 181. The valves 62 and 621 control the liquid flow rate for the nozzle apparatus 35 and the center fountain 65, respectively. The lights 72 are also controlled by the computer 100 via the converter 110 and electrical lines 184. The pump 60, which can be a constant or variable speed pump, can also be controlled by the converter 110 via electrical lines 183.

For this embodiment, the sequence of the water flow is from the pump inlet 61 through the pump 60 and valves 62 and 621 to the fountain nozzles 38 and 65, respectively, via pipes 66 and 64. The water exits out the nozzles back into the basin 500 where the cycle repeats. The valve 62 controls the water flow to the nozzle apparatus 35 and valve 621 controls the water flow to the center fountain 65. The Pipe 66 is can be a flexible or rigid pipe to the nozzle apparatus 35. When the pipe 66 is rigid pipe, the interface to the nozzle apparatus 35 may be or is preferably via a flexible hose or a gimbaled arrangement. The valve 621 controls the water flow through the center fountain nozzle 65. The direction of the nozzle apparatus 35 is controlled individually by the computer 100 via the converter 110 and electrical lines 181.

Figure 3C:
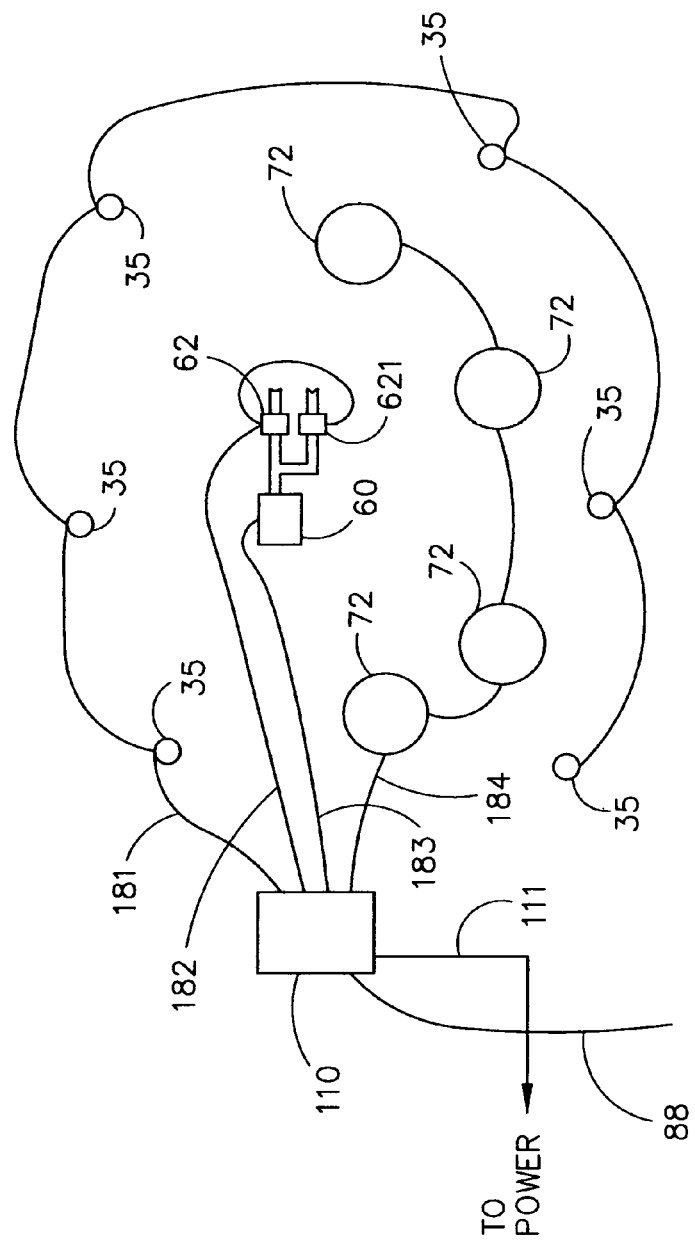
FIG. 3C is a wiring diagram showing a high level view of the attachments of the components.

FIG. 3C shows a high level wiring schematic of the embodiment in FIG. 3B where electrical wires 181 connect the individual nozzle apparatus 35 to the converter 110. In this embodiment, there are several electrical wires 181 to individually connect each nozzle apparatus 35 to the converter 110. In FIG. 3C, the electrical wires 182 controls valves 62 and 621 individually. Electrical wire 183 controls the pump 60 which can be a variable speed or constant speed pump. Electrical wires 184 control the lights 72. In this example, four lights are individually controlled. The power 111 for the converter 110 can be household power supply 110 VAC, a low voltage AC/DC power supply, or combination.

Figure 3D:
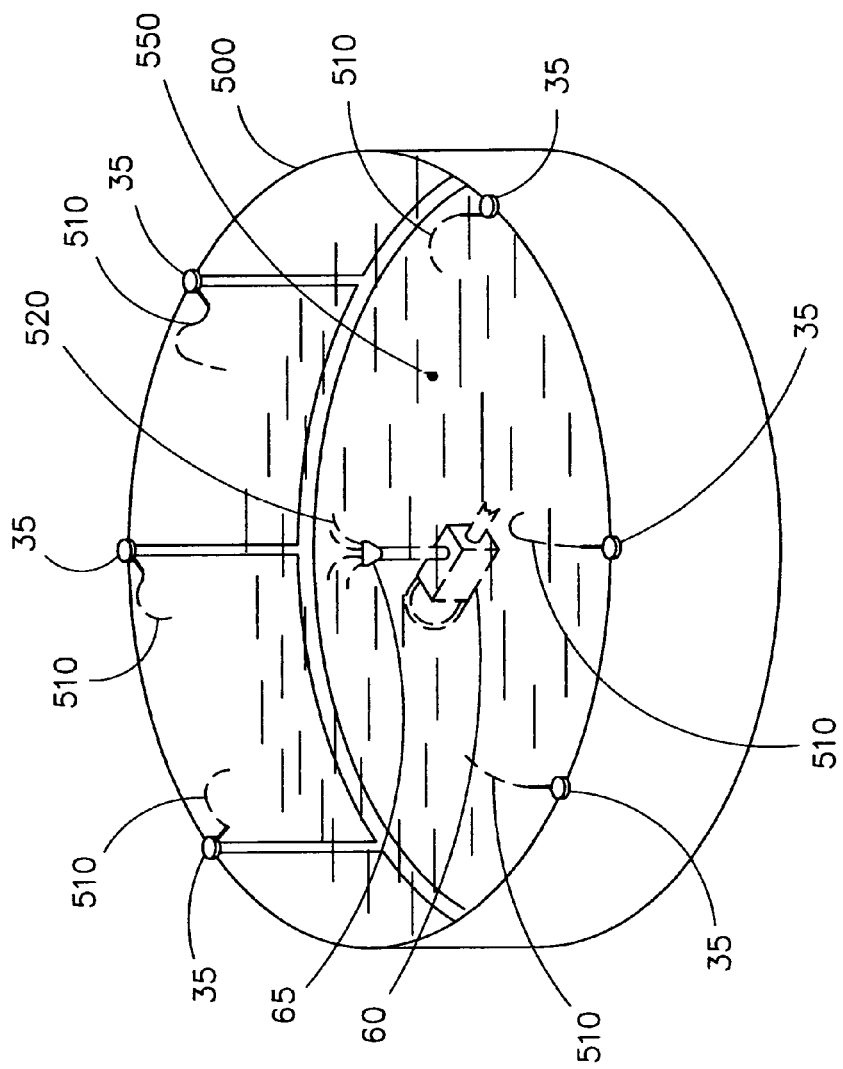
FIG. 3D is a detailed perspective of the desired effect from operating the components in a system.

FIG. 3D shows the desired results for controlling several fountain apparatuses 35 in a distributive system and the center fountain 65. The liquid 550, typically water, in the basin 500 is pressurized via the pump 60 to the nozzle apparatus 35 and the center fountain 65. The nozzles on these fountain apparatus provide a liquid stream 510 from several fountain apparatuses 35 and liquid stream 520 from the center fountain 65. The flow rate and direction of these fountain apparatus may be choreographed to the music on the computer 100 shown in FIGS. 3A and 3B to give an aesthetically pleasing effect.

Figure 4D:
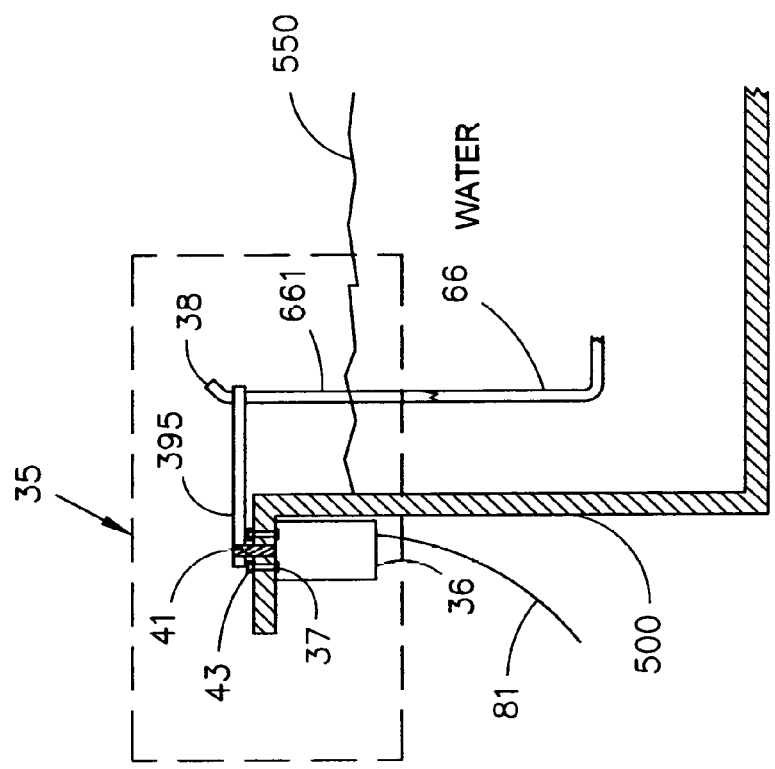
FIG. 4D is a detailed perspective view of the apparatus of FIG. 4A in an application.

FIGS. 4A, 4B, 4C, and 4D show another embodiment of the nozzle apparatus 35. FIG. 4A shows an isometric drawing of a rigid pipe 661 connected to the apparatus via an attachment arm 395. The position-controlled motor 36 controls the nozzle 38 via the output gear 41 and attachment arm 395. The position-controlled motor 36 is controlled via communication wire(s) 81 from a computer 100 (not shown). FIGS. 4B and 4C show the top and side views, respectively, of this embodiment. FIG. 4D shows one implementation of attaching the nozzle apparatus 35 to the basin 500. In this design, the position-controlled motor 36 is attached by bolts 43 via the mounting holes 37 to the top to the basin 500 similarly as FIG. 2. The attachment arm 395 is mounted on the gear shaft 41 which is attached to the nozzle 38 and the pipe 661. However, the pipe 661 in this embodiment is coming directly from the water container instead outside the water container as shown in FIG. 2.

Figure 5D:
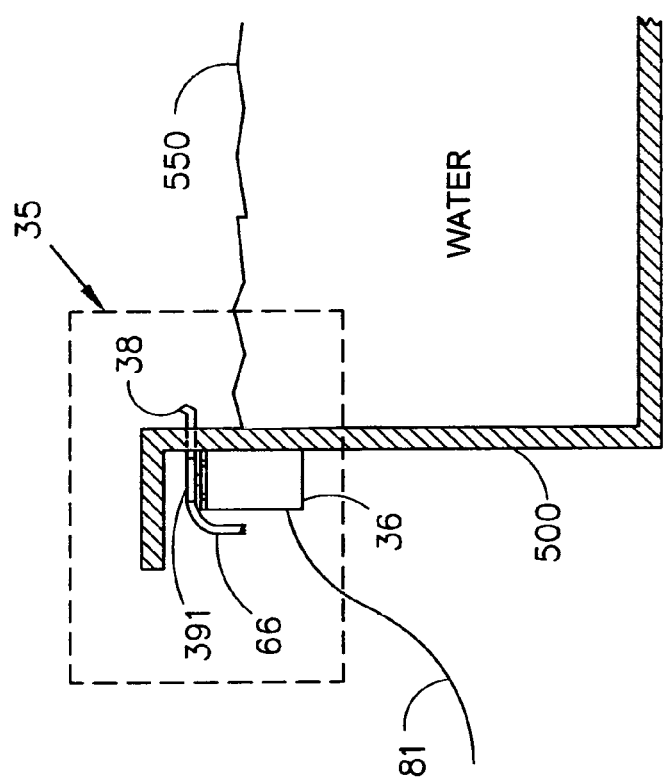
FIG. 5D is a detailed perspective view of the apparatus of FIG. 5A in an application.

FIGS. 5A, 5B, 5C, and 5D show another embodiment of the nozzle apparatus 35. This embodiment is similar to FIG. 2 except for an attachment mechanism 391 to the position-controlled motor 36. The attachment mechanism 391 allows for an extended nozzle 38 from the output gear 41. FIG. 5A shows an isometric view of the embodiment and FIGS. 5B and 5C show the top and side views, respectively. With the extended mechanism 391, the fountain apparatus 35 can be mounted on the side of the basin 500 as shown in FIG. 5D. A hole is made in or through the side of the basin 500 to allow the nozzle 38 to extend from the side. In this embodiment, the majority of the fountain apparatus is hidden from view.

Figure 6D:
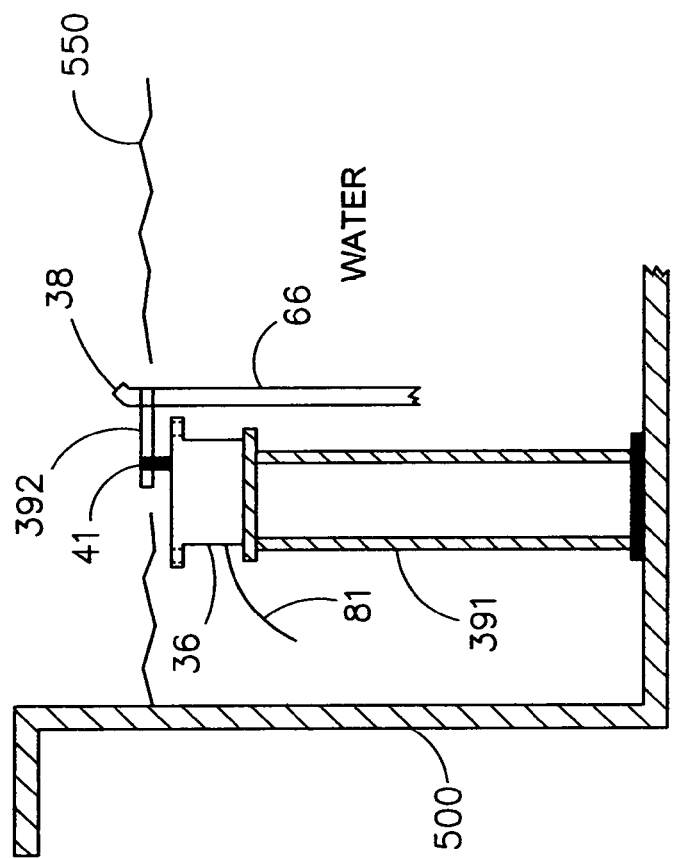
FIG. 6D is a detailed perspective view of the apparatus of FIG. 6A in an application.

FIGS. 6A, 6B, 6C, and 6D show another embodiment of the nozzle apparatus 35. In the isometric view shown in FIG. 6A, a different attachment to the position-controlled motor 36 to the nozzle 38 is illustrated. An attachment mechanism 392 which is shown as an elliptical disc is attached to the nozzle 38 and the output gear 41. This attachment mechanism 392 can be any shape such as circle, elliptical, square, narrow arm, triangular shape, etc. The geometric shape of the mechanism 392 can two or three dimensional. FIGS. 6B and 6C show the top and side views for this embodiment. In FIG. 6D, the nozzle apparatus 35 is submerged under the water 550 and is mounted on a platform 371. The position-controlled motor 36 is waterproof device such as Traxxas Model 2056. The nozzle 38 is only exposed above the water level 550. With this embodiment, the fountain apparatus can be mounted in a pool, pond, lake, or any water body.

Figure 6F:
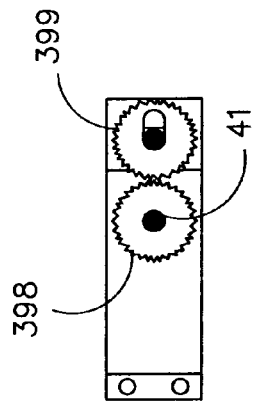
FIG. 6F is a top view of one embodiment of the apparatus where the nozzle is attached in vertical direction with gears.
Figure 6G:
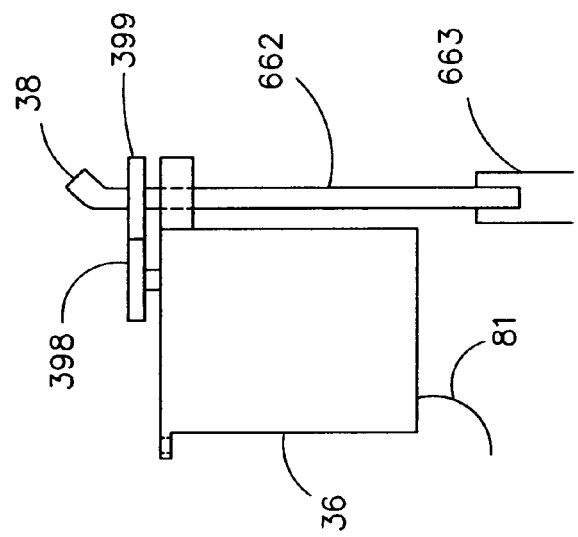
FIG. 6G is a side view of one embodiment of the apparatus where the nozzle is attached in vertical direction with gears.
Figure 6E:
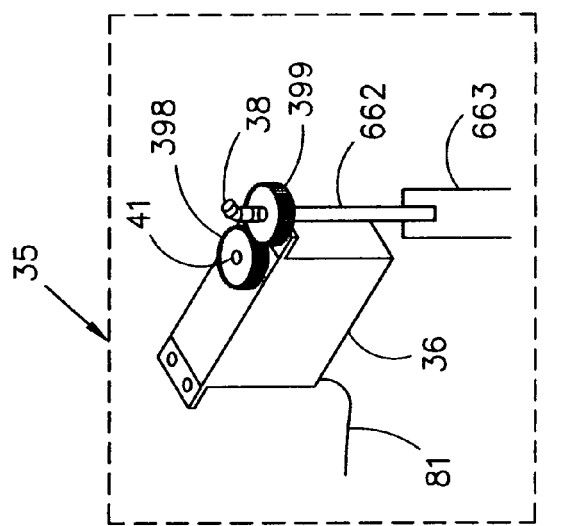
FIG. 6E is an isometric view of one embodiment of the apparatus where the nozzle is attached in vertical direction with gears.

FIGS. 6E, 6F, and 6G show another embodiment where the output gear 41 is attached to a gear 398. FIG. 6E is an isometric view of the embodiment. FIG. 6F is the top view of the embodiment and FIG. 6G is the side view of the embodiment. The gear 398 controls the rotation of the nozzle 38 via a gear 399. Since the nozzle 38 rotates around the gear 399, the pipe 662 is on a swivel arrangement on pipe 663. With this embodiment, the hose 663 is stationary and pipe 662 rotates via gear 399, and the nozzle 38 rotates with pipe 662. This embodiment allows mounting of the nozzle apparatus 35 to be used in close quarters.

Figure 7B:
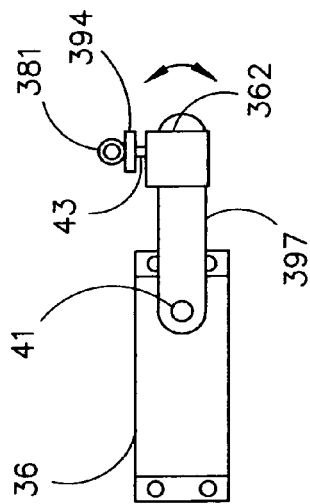
FIG. 7B is a top view of an apparatus with two position-controlled motors.
Figure 7C:
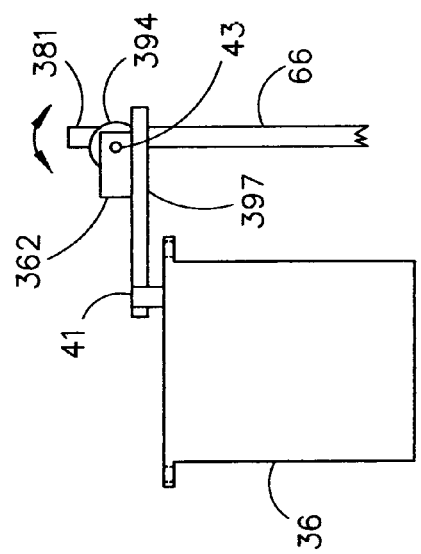
FIG. 7C is a side view of an apparatus with two position-controlled motors.
Figure 7A:
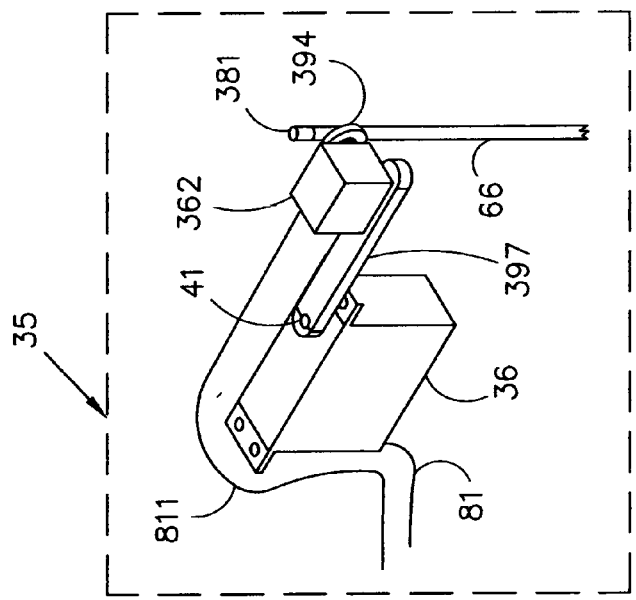
FIG. 7A is an isometric view of an apparatus with two position-controlled motors.

FIGS. 7A, 7B, and 7C show another embodiment of the nozzle apparatus 35. In the isometric view shown in FIG. 7A, two position-controlled motors 36 and 362 are used. The water flow from a straight nozzle 381 is controlled in two different axes. The position-controlled motor 36 controls the movement around the output gear 41, as shown in the top view in FIG. 7B, and position-controlled motor 362 controls the movement around an output gear 43 in a different axis, as shown in the side view of FIG. 7C. An Attachment arm 397 attaches the output gear 41 from the position-controlled motor 36 to the position-controlled motor 362. An attachment mechanism 394 connects the output 43 from the position-controlled motor 362 to the nozzle 38. The hose 66, which can be a flexible or rigid pipe, is attached to the straight nozzle 381 to provide pressurized liquid. Controlling both axes provides for a more flexible design and allows for more elegantly choreograph water shows with (or without) the music.

FIGS. 7D and 7E show another embodiment of the nozzle apparatus 35. This embodiment is similar to the FIG. 7A embodiment in operation, but the position-controlled motors 36 and 362 are mounted directly to each other's output shafts. As shown in FIG. 7D, the position-controlled motor 362 is mounted on top of position-controlled motor 36 via an attachment mechanism 396. The straight nozzle 381 is mounted to position-controlled motor 362 via attachment mechanism 394. Communication and power links 81 and 811 connect position-controlled motors 36 and 362, respectively. FIG. 7E is the top view of this embodiment.

FIG. 7F show another embodiment of the nozzle apparatus 35 which uses three position-controlled motors 36, 362, and 364. As similar to the embodiment in FIG. 7D, the position controlled motor 36 and 362 allow for two degrees of movement. With addition of the third position-controlled motor 364 (which is attached to position-controlled motor 36 via its output shaft 45 via attachment mechanism 396), the straight nozzle 381 can be raise or lower into the water.

FIGS. 8A and 8B show an isometric view and side view, respectively, of the position-controlled ball valves 62 and 621. A position-controlled motor 36 is mounted on the ball valve handle 662. A shaft 41 extends into the handle 389 that controls the ball valve 663 position shown in FIG. 8B. A rapid response of the position-controlled motor 36 allows for synchronization of the water flow to the music. The position-controlled motor 36 is attached to the ball valve 662 by fasteners to the mounting holes 37 of the position-controlled motor 36, which is controlled by the electrical wire(s) 82.

Figure 9B:
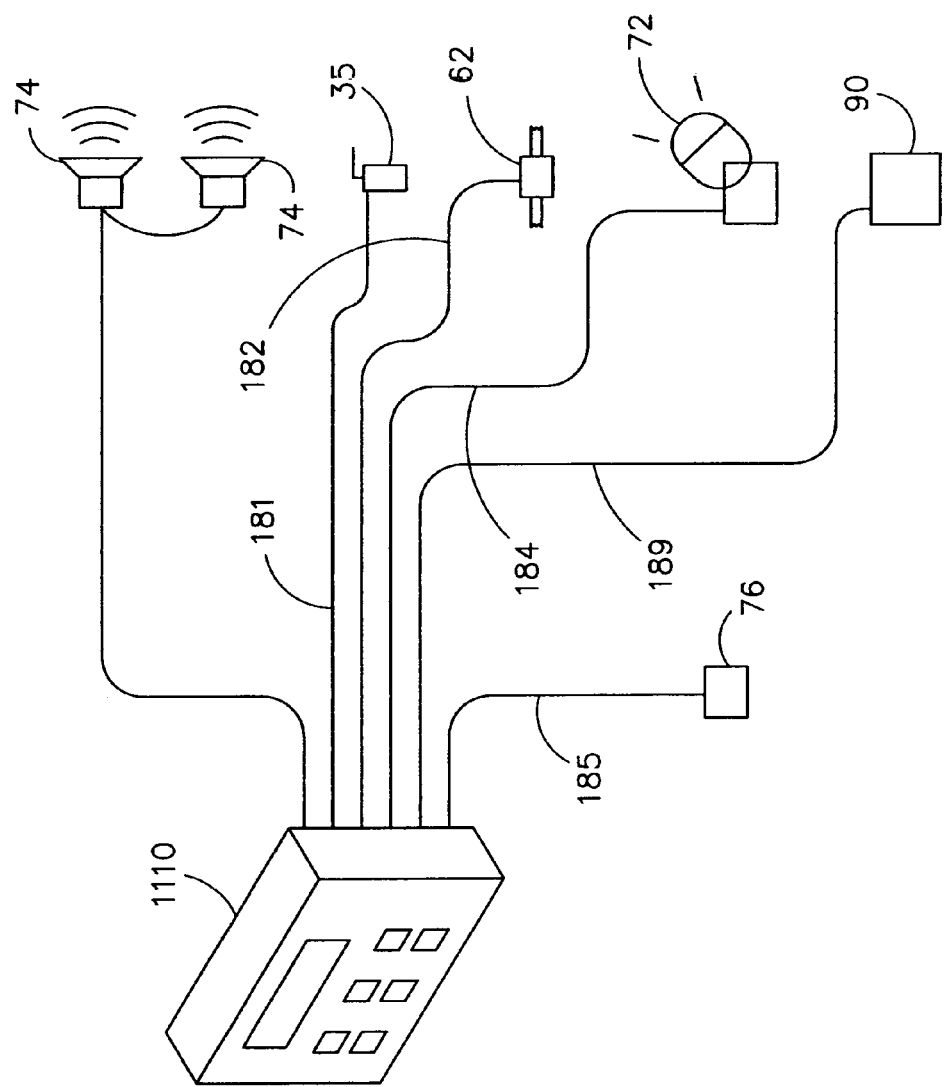
FIG. 9B show an embodiment of the system components with dedicated computer.

FIGS. 9A and 9B show other embodiments for controlling the components. FIG. 9A shows a computer, such as a Laptop PC 100, communicating wirelessly via transceivers 114 and 112 (one on or in the laptop PC 100 and one on or in the converter 110) to control the nozzle apparatus 35, valves 62, lights 72, and other components 90, e.g. such as pump 60. Here, the communication link to from the computer 100 to the converter 110 is wireless. The computer 100 can also drive music to the speakers 74 in synchronization with the components for the water fountain. Power to the converter 110 is from electrical lines 111. A sensor 76, shown attached to the converter 110 via electrical lines 185, provides feedback information to the computer 100. The sensor 76 can be a motion sensor, a light sensor, a heat sensor, a temperature sensor, a moisture sensor, level sensor, wind sensor, etc. Some examples for using these sensor 76 is as a motion sensor which could start a new song in a sequence, as a light sensor for turning the lights on at night, as a wind sensor for changing the water flow rate, and as a level sensor for indicating the water level.

FIG. 9B shows a standalone computer 1110 directly driving the components without a converter. The standalone computer 1110 contains the circuitry to provide the proper protocol for each component. For example, the computer 1110 contains audio circuitry to drive the speakers. The computer 1110 has the capability to provide the position information to the nozzle apparatus 35 and valves 62. The computer 1110 contains drive capability to turn on the lights and drive other components 90 such as a pump. The computer 1110 may have the ability to input sensor information similarly as the general computer 100. In this embodiment, the components may have the drive capability built into the components, and the computer 1110 provides the signal information to the components.

Figure 10A:
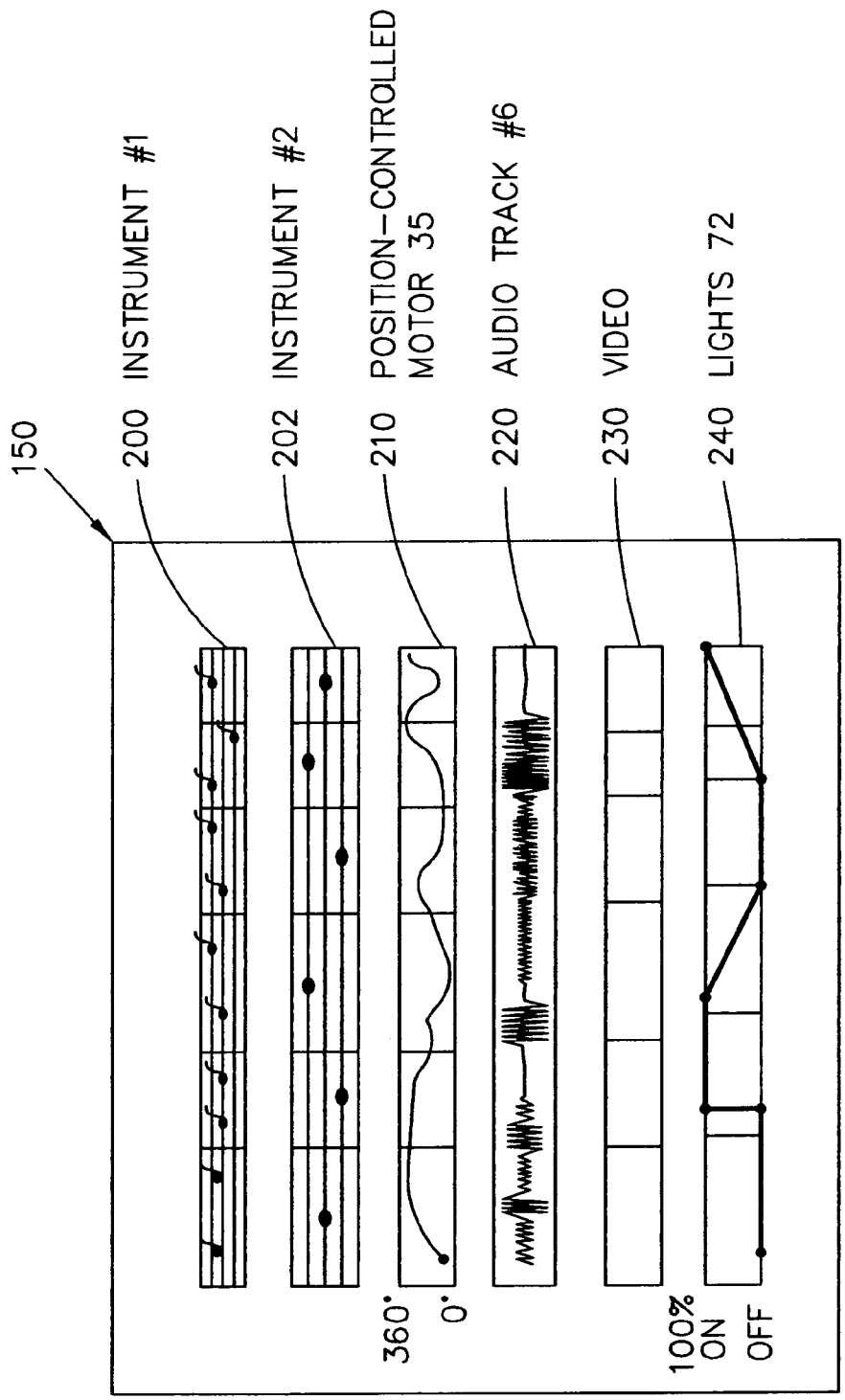
FIG. 10A illustrates a software program with set of patterns for controlling components.
Figure 10B:
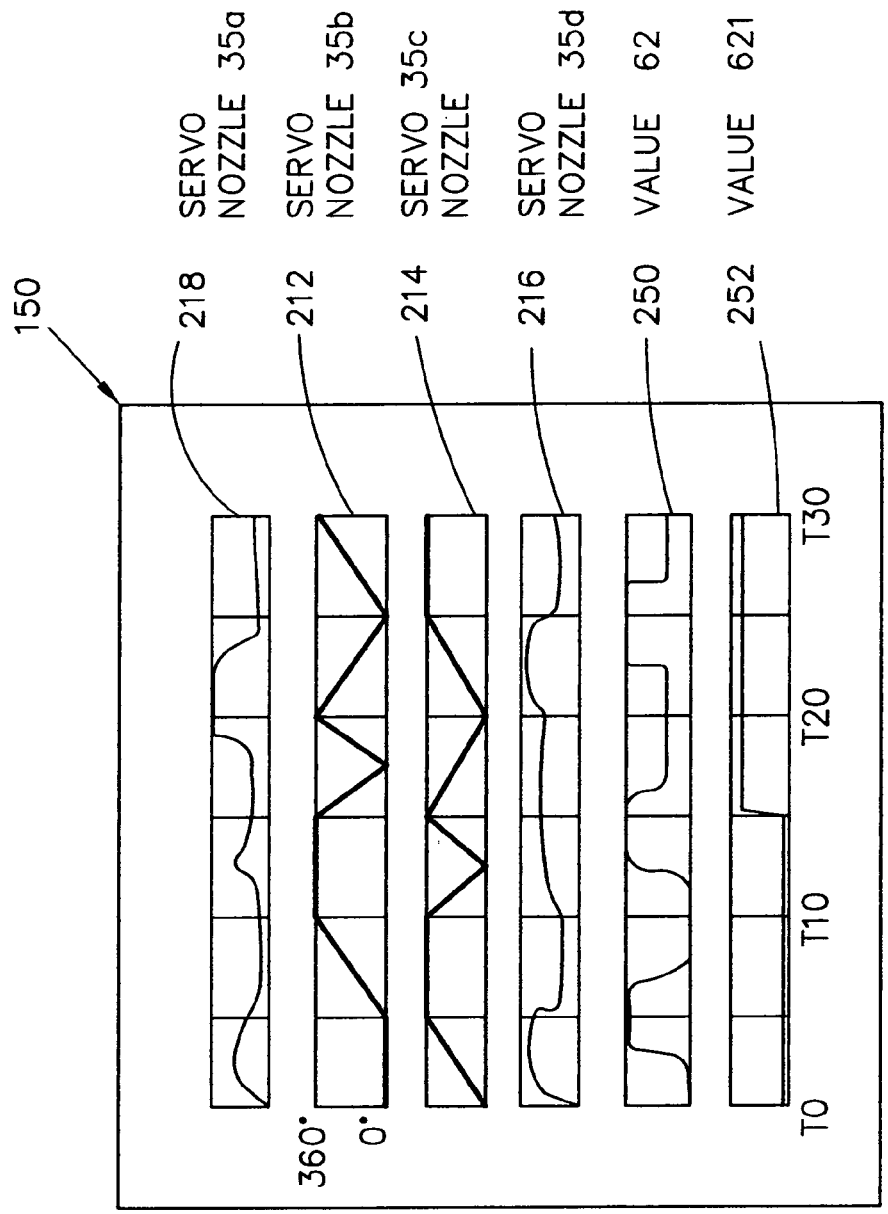
FIG. 10B illustrates a software program with set of patterns controlling the nozzles and valves.

FIGS. 10A and 10B illustrate a display a software program 150 executing on the computer 100. The software program may be, for example, a MIDI Sequencer, which synchronizes the musical instruments with the direction of the nozzle apparatus 35, the brightness of the lights 72, and/or the flow of the water via the valves 62 and 621. These software programs are commercially available for recording and playing musical instruments from Apple Computer Company, Inc. of Cupertino, Calif. called Garageband and Logic Pro, from Catwalk, Inc. of Boston, Mass. called Music Creator and Sonar 7, from Ableton from Berlin, Germany called Ableton Live, from Digidesign of Daly City, Calif. called ProTools, from MOTU, Inc. of Cambridge, Mass. called Digital Performer, and from Steinberg Media Technologies GmbH from Germany called Cubase 5. These software programs can also be used to control the nozzle apparatus 35, valves 62 and 621, lights 72, and other items in addition to playing musical instruments or audio through the speakers 74. By synchronizing the direction of the fountain apparatus, the water flow, and the lights with the music, an entertainment value is achieved. As shown in FIG. 10A, preset patterns 200 and 202 are for the Instruments #1 and #2, respectively. The direction of nozzle apparatus 35 is controlled by MIDI pattern 210. Audio Track #6 shown in pattern 220 is sequence with other MIDI or Audio tracks. Video and Lights 72 are also sequence with this music as shown in patterns 230 and 240, respectively.

FIG. 10B shows the software program 150 driving the direction of the fountain apparatus's 35a, 35b, 35c, and 35d via preset patterns shown as 218, 212, 214, and 216, respectively. The software program 150 also controls the flow rate through valves 62 and 621 via preset patterns shown as 250 and 252, respectively. The fountain apparatuses 35a, 35b, 35c, and 35d are the same apparatus but positioned around a basin or pool and are controlled individually by each track.

FIG. 11A shows the standard digital protocol for the musical notes in the MIDI standard. MIDI defines a protocol for each musical note by defining the note such as middle C and the velocity of the note. The MIDI standard was standardized in the early 1980's and later expanded to control other audio parameters such as Pan and Modulation as shown in FIG. 11B.

Figure 12A:
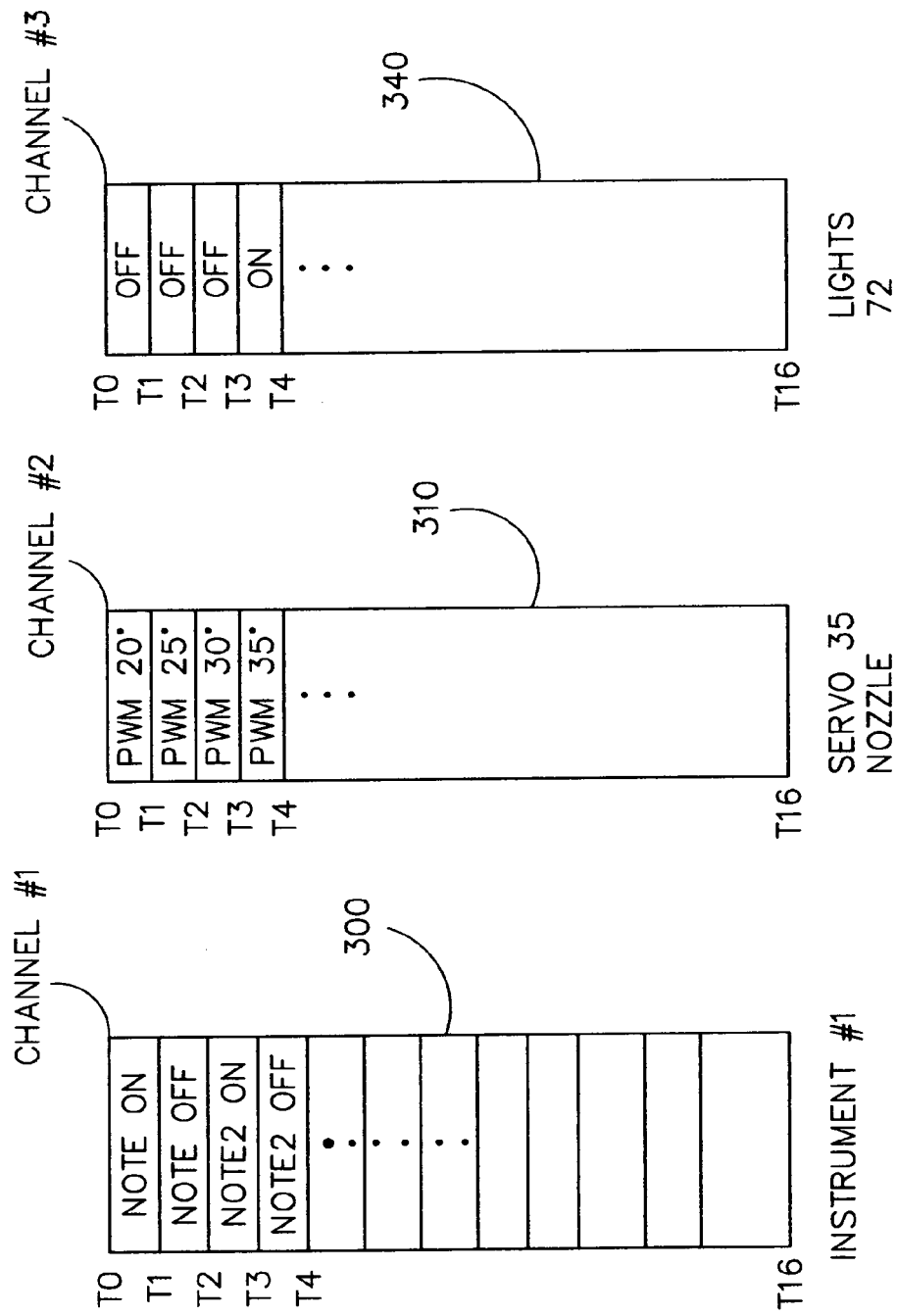
FIG. 12A shows three channels of data for controlling instruments and components.

In FIG. 12A, Instrument #1 which could be any musical instrument is defined as Channel #1 denoted as block 300. The instrument was recorded via the MIDI protocol. Each time a key is pressed, the note is recorded as an ON and the velocity of the key pressed will also be recorded to denote the volume. Other effects such as holding the key down for period of time will provide length of time. Each time period, T0, T1, . . . , T16 records the musical instrument. In addition to playing the music, one can use the MIDI protocol to control position-controlled motors, valves, lights, etc. FIG. 12A shows the direction of nozzle apparatus 35 choreograph and recorded via channel #2 denoted as block 310 with the musical instrument #1 to provide synchronizing behavior with the music and the fountain apparatus position. Likewise, the lights 72 via channel #3 denoted as block 340 were also choreographed with the music and the fountain apparatus to get the desired entertainment value.

Another example to utilize the MIDI protocol is to drive the servos or lights using the MIDI continuous controller messages as shown in FIG. 11B. For example, the Continuous Controller #20, which has values 0-127, can be defined as the position-controlled motor output to control the motor movement from 0-180 degrees (or 0-360 degrees) where the scale would be 1 to 1.5 ratio (value 20 would be 30 degrees under). This continuous controller messages could be recorded on separate channels 300, 310, and 340 as in FIG. 12A, or a single channel 350 could be used as shown in FIG. 12B. In FIG. 12B, the pulse width modulation, PWM, is the output to the position-controlled motors or nozzle apparatus.

Figure 13:
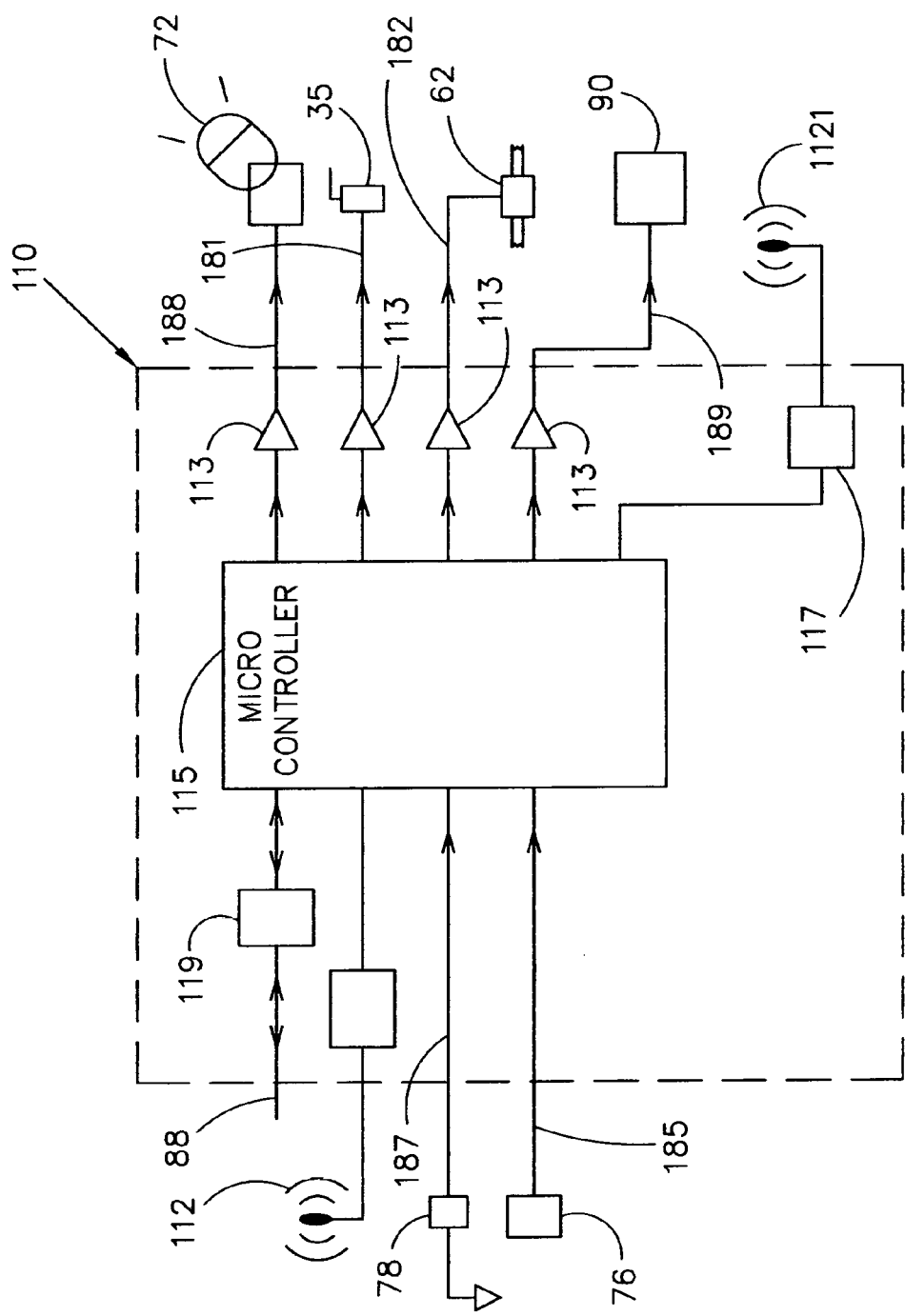
FIG. 13 shows a block diagram of one embodiment of the converter and the attached components.

FIG. 13 shows the block diagram of one embodiment of the converter 110. The converter 110 contains a USB interface box 119 for connection to the computer 100 via electrical wires 88 which forms the communication link and the onboard microcontroller 115. Microcontroller 115 can be any available microcontrollers from manufacturers such as Microchip International, Intel, Motorola, NEC, AMD, or Atmel. The microcontroller 115 receives the control information from the computer 100 via the electrical wires 88 and interface box 119 and outputs the control information to the device via the drivers 113 to the lights 72, nozzle apparatus 35, valves 62, and other devices 90. Also, the devices can be controlled wirelessly via the transceiver 112. In addition to driving the devices, the converter 110 can input sensor information such as the moisture detector 78. Other sensors such as motion, light, heat, temperature, solar, audio, visual are represented by an input device 76. The converter 110 may also have the capability to drive other components wirelessly via a transceiver 117 and an antenna 1121.

Figure 14A:
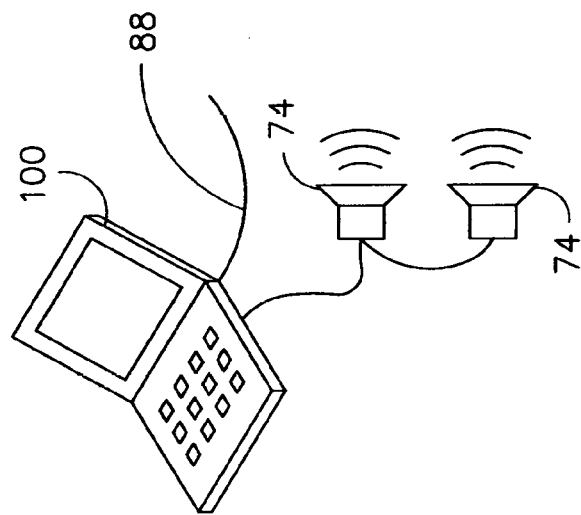
FIG. 14A shows a laptop computer attached to external speakers and a wired connection to components.

FIG. 14A shows the high level block diagram of the computer 100 and the output connections for one embodiment. The output connections are through a serial or parallel network 88 to drive the converter 110 or the components directly and the speakers 74.

Figure 14B:
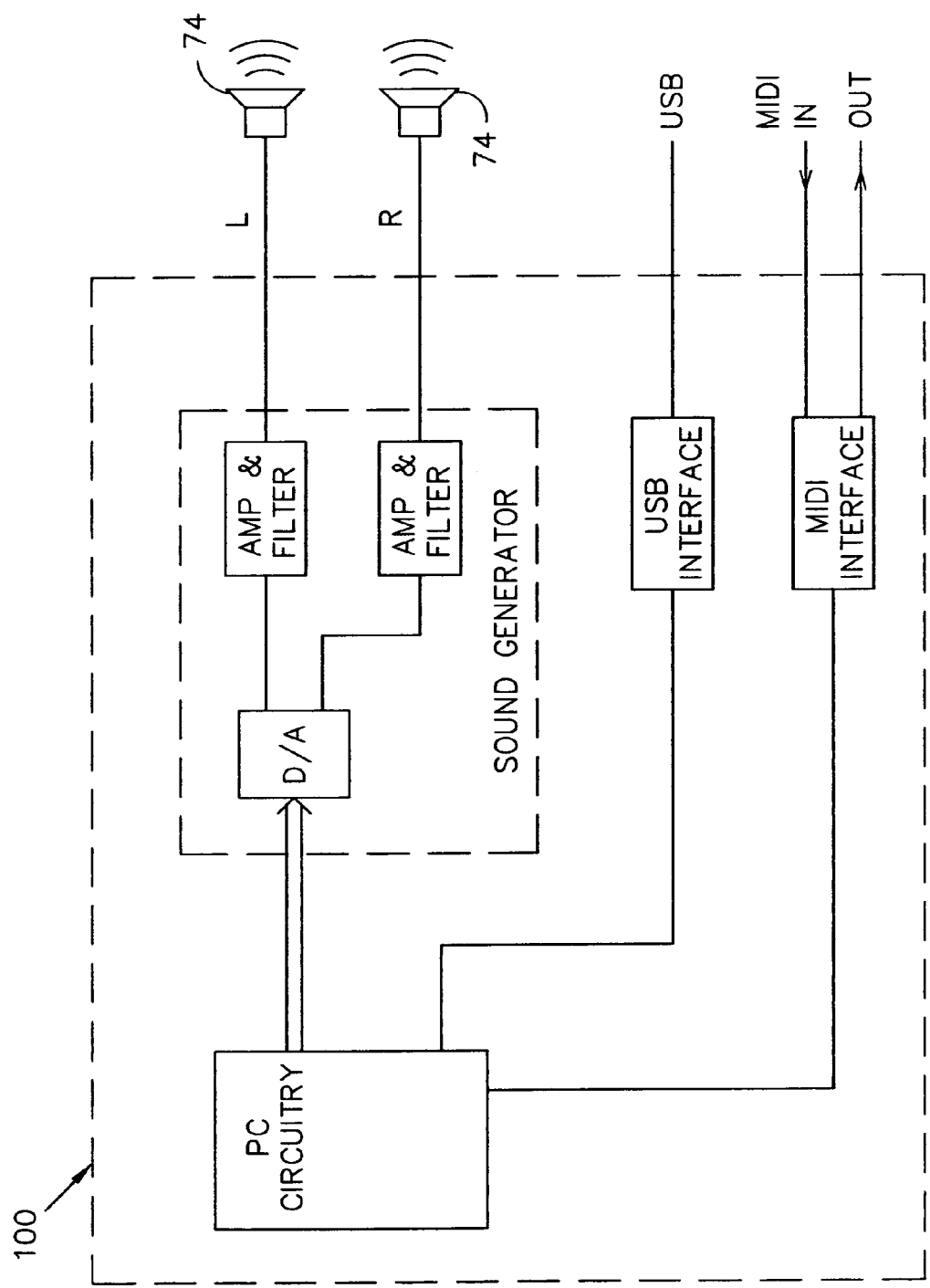
FIG. 14B is a block diagram of one embodiment of the computer and external attachments to components.
Figure 14C:
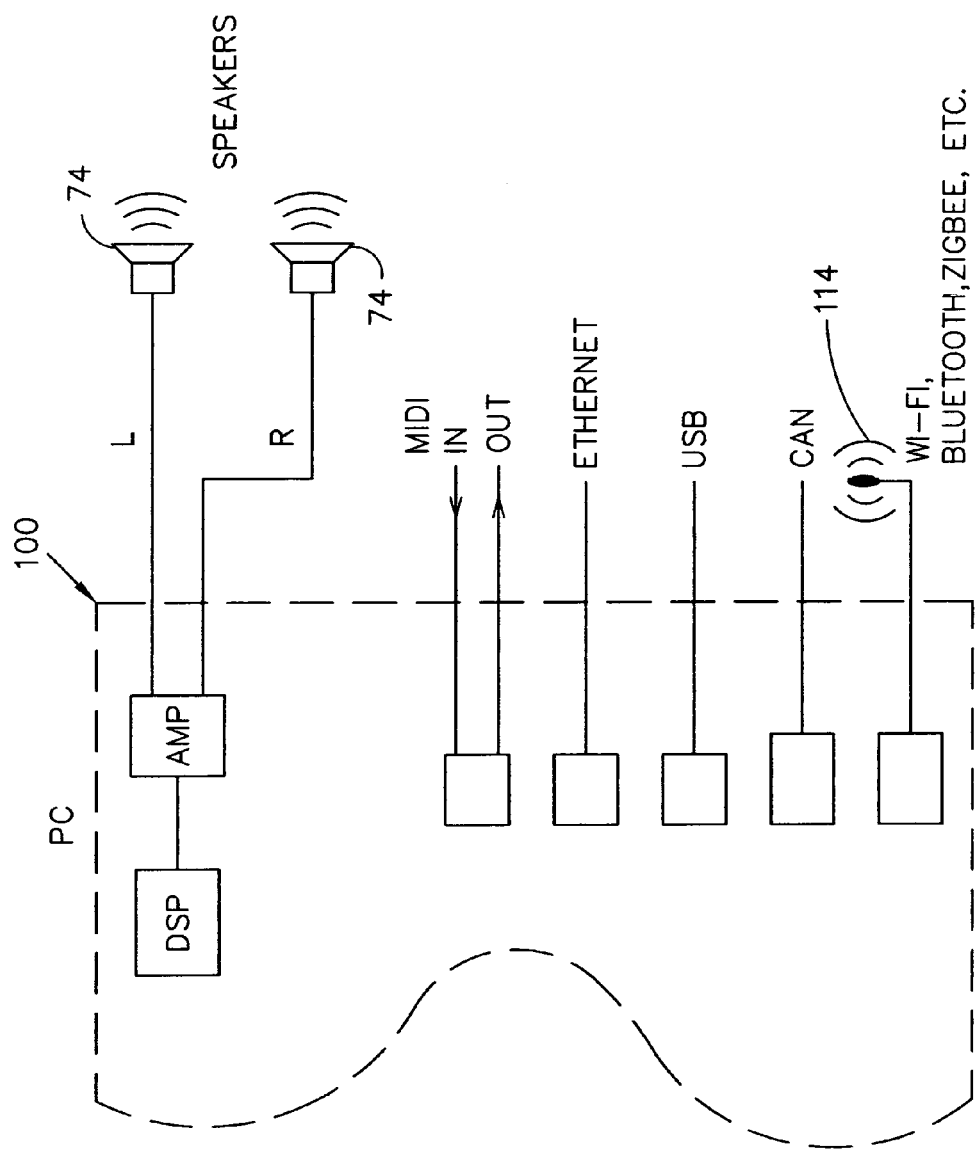
FIG. 14C is a block diagram of another embodiment of the computer with external attachments.

FIG. 14B shows another embodiment of the computer 100 to control the devices. Computer 100 has circuitry such as a sound generator circuitry which converts the recorded MIDI file or audio file to audio frequencies which drive the speakers 74. Likewise, the recorded MIDI channels with preset patterns control the devices via the MIDI interface. The devices such as the nozzle apparatus 35 convert the MIDI protocol to control the position-controlled motors base on the information on the recorded channel while playing back the music and controlled channels. FIG. 14C shows the computer 100 with the MIDI sequencer program driving or sensing information to the devices via wired or wireless protocols. The wired protocols could be Ethernet, DMX (Digital MultipleX), USB, CAN (Controller Area Network), MIDI, RS485, PLC (Power Line Carrier), LIN (Local Interconnect Network), and TCP/IP (Transport Control Protocol/Internet Protocol). In wireless embodiments or hybrid versions, available protocols include Wi-Fi (Bluetooth, wireless MIDI, wireless DMX, Z-wave, Zig-Bee, or wireless USB. Other wireless or wire protocols can be used such as RC, Radio Control, protocol or dedicated proprietary protocol.

FIGS. 15A and 15B show the fountain system with the wireless converter 110 driving several of the fountain apparatuses 35, the valve 62 and the lights 72. In FIG. 15A, the fountain water streams 510 are synchronized in a counterclockwise direction. In FIG. 15B, the fountain water streams are synchronized in a clockwise direction.

Figure 16:
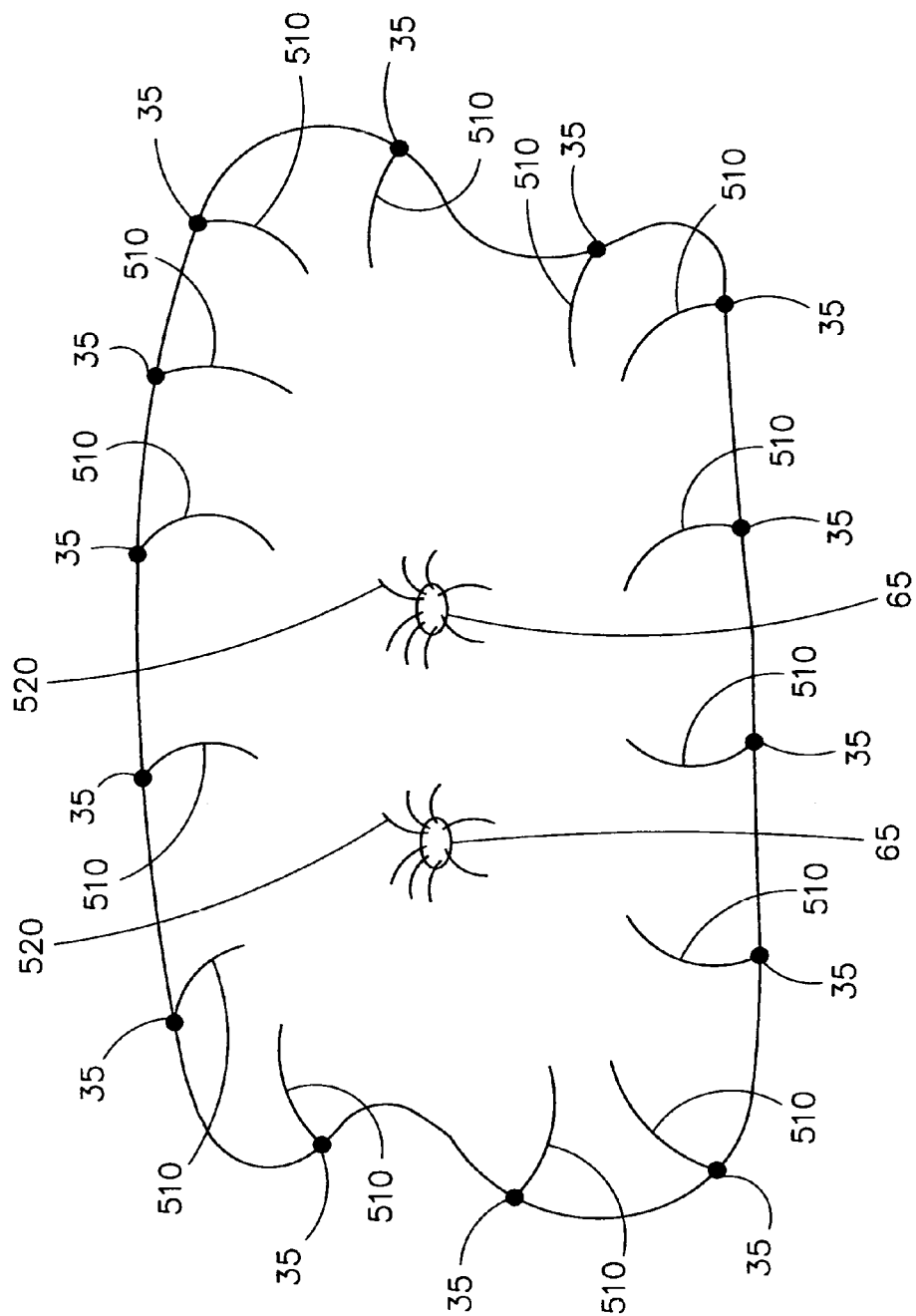
FIG. 16 is a top view of the placements of the apparatuses and center nozzles in an application.

FIG. 16 shows the fountain system with many nozzle apparatus 35 on the side of the basin 508 and two center fountain heads 65. The water streams 510 may be choreographed together and with the center fountain streams 520.

FIGS. 17A-17E shows the fountain system with different shape basins with several fountain apparatuses 35 around the perimeter in a distributive manner. FIG. 17A shows the round basin 500. FIG. 17B shows a square basin 501. FIG. 17C shows a rectangular-shape basin 502. FIG. 17D shows an elliptical basin 503 and FIG. 17E shows a free-form basin 504. These shapes are only examples of the different fountains that can be created. Other shapes can be used within the scope of these embodiments.

Figure 18:
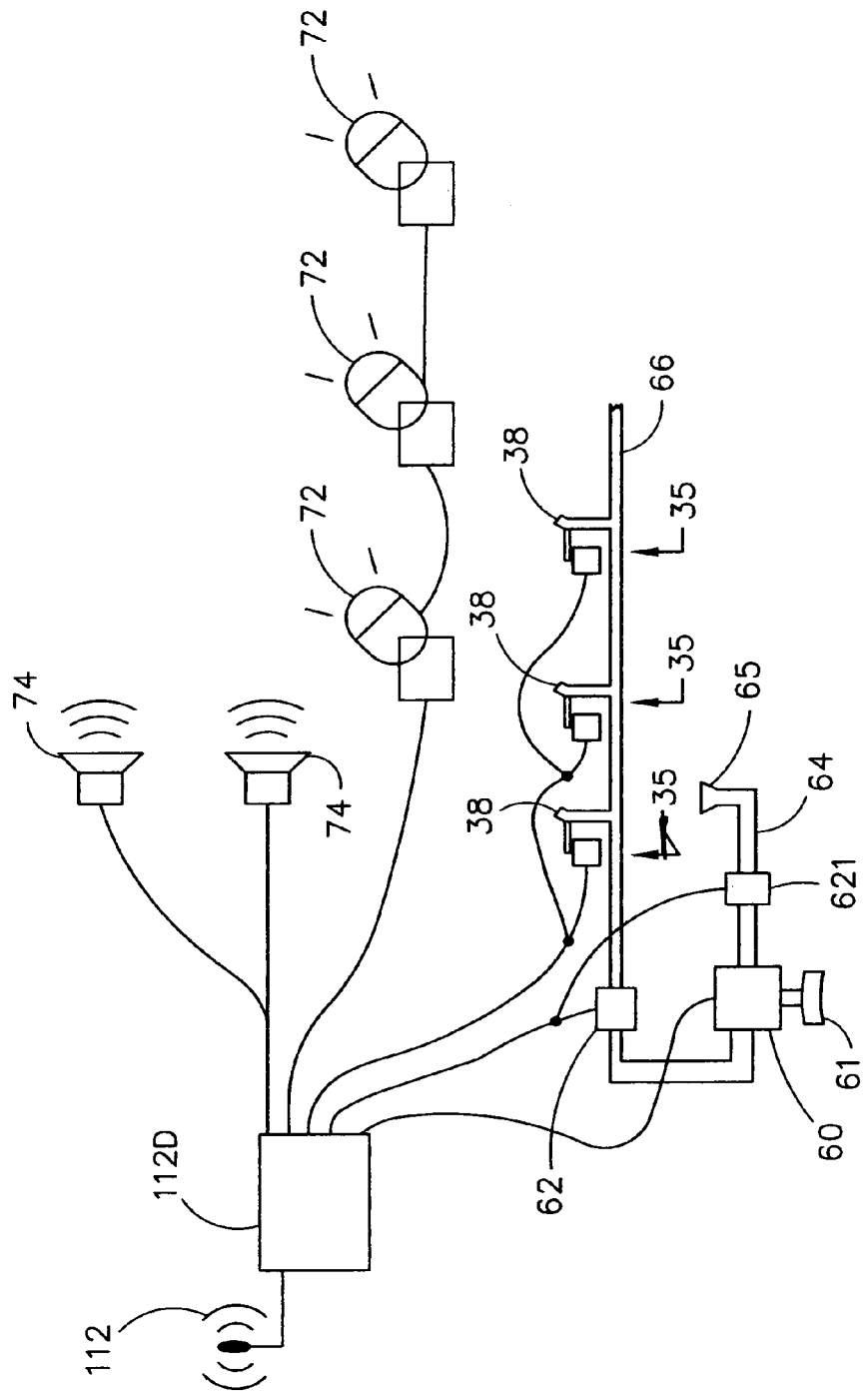
FIG. 18 is a block diagram of a fountain system with wireless converter controlling the components.
Figure 19:
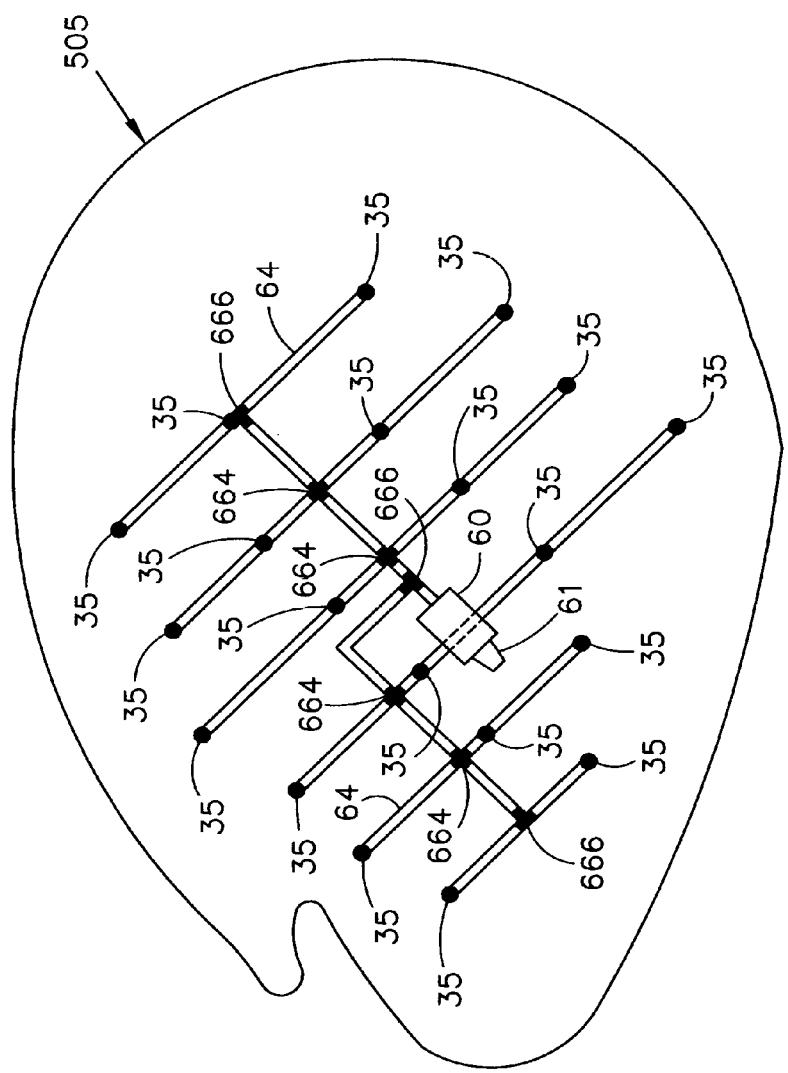
FIG. 19 is a top view of a fountain system showing the apparatuses arranged in a body of water.

FIG. 18 shows the diagram of the fountain system utilizing the components in a free-form pattern. A wireless converter 1120 drives the speakers 74, several lights 72, several fountain apparatuses 35, the valves 62 and 621, and the pump 60. The water flow in this free-form embodiment goes from the inlet 61 of the pump 60 to the valves 62 and 621. The valve 62 controls the pressurized water to pipe 66 and valve 621 controls the pressurized water to pipe 64. The pressurized water in pipe 66 exits through the nozzles 38 from the nozzle apparatus 35 and the pressurized water in pipe 64 exits through the center fountain nozzle 65 as described earlier. However, the free-form fountain system can be installed in any pattern as shown in FIG. 19. The free-form water structure 505 such as a pond, pool, or small lake would contain similar components as a defined shape, but installed in or near the middle of the water structure 505. FIG. 19 also shows the water pipe 64 connected together with 'T' and 'Y' shape pipe connectors, 664 and 666, respectively.

Figure 20:
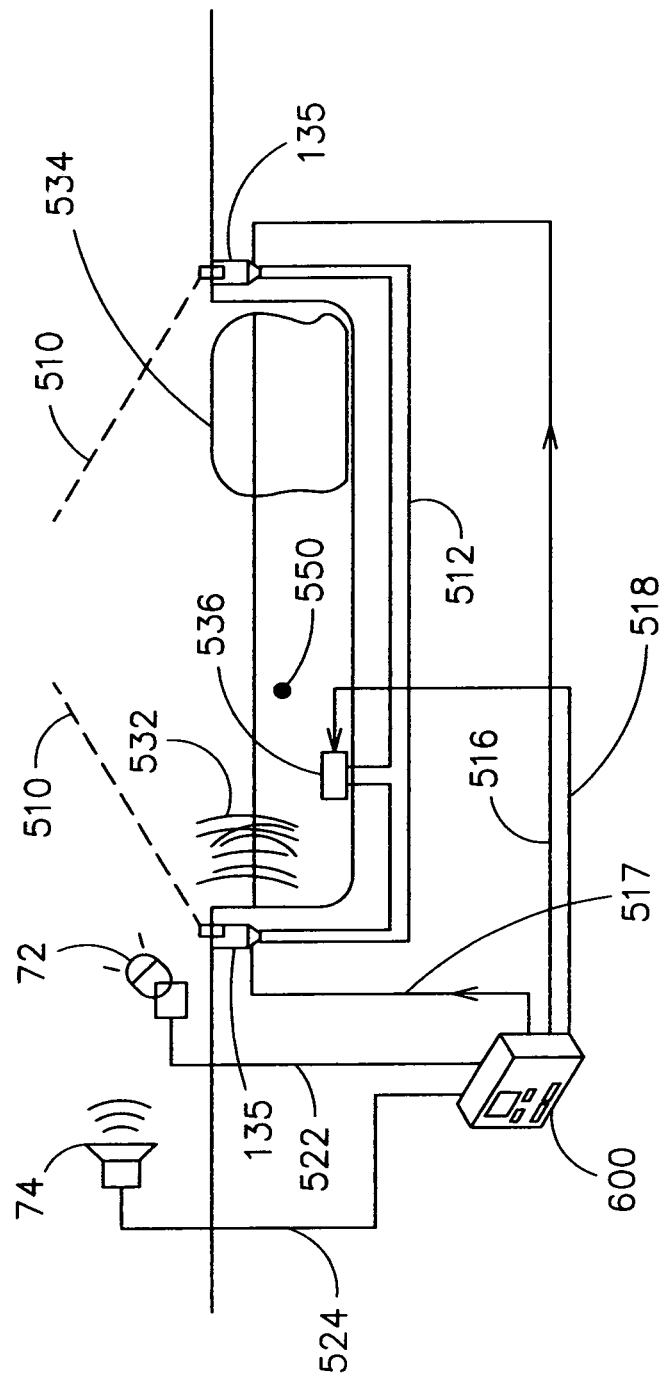
FIG. 20 is a side view of a fountain system in a pond application.

FIG. 20 shows another embodiment for rigid or free-form structures used on a pond or small lake. An enclosed nozzle apparatus 135 is connected to the pressurized water via a pipe 512 from a pump 536. The lights 72, speaker 74, the enclosed nozzle apparatus 135, and pump 536 are controlled by an embedded computer 60. The speaker 74 driven by electrical wire 524, the light 72 is controlled by a line 522, and the enclosed nozzle apparatuses 135 direction is controlled by lines 516 and 517. A rock 534 and plants 532 are added for a pleasing effect.

Figure 21:
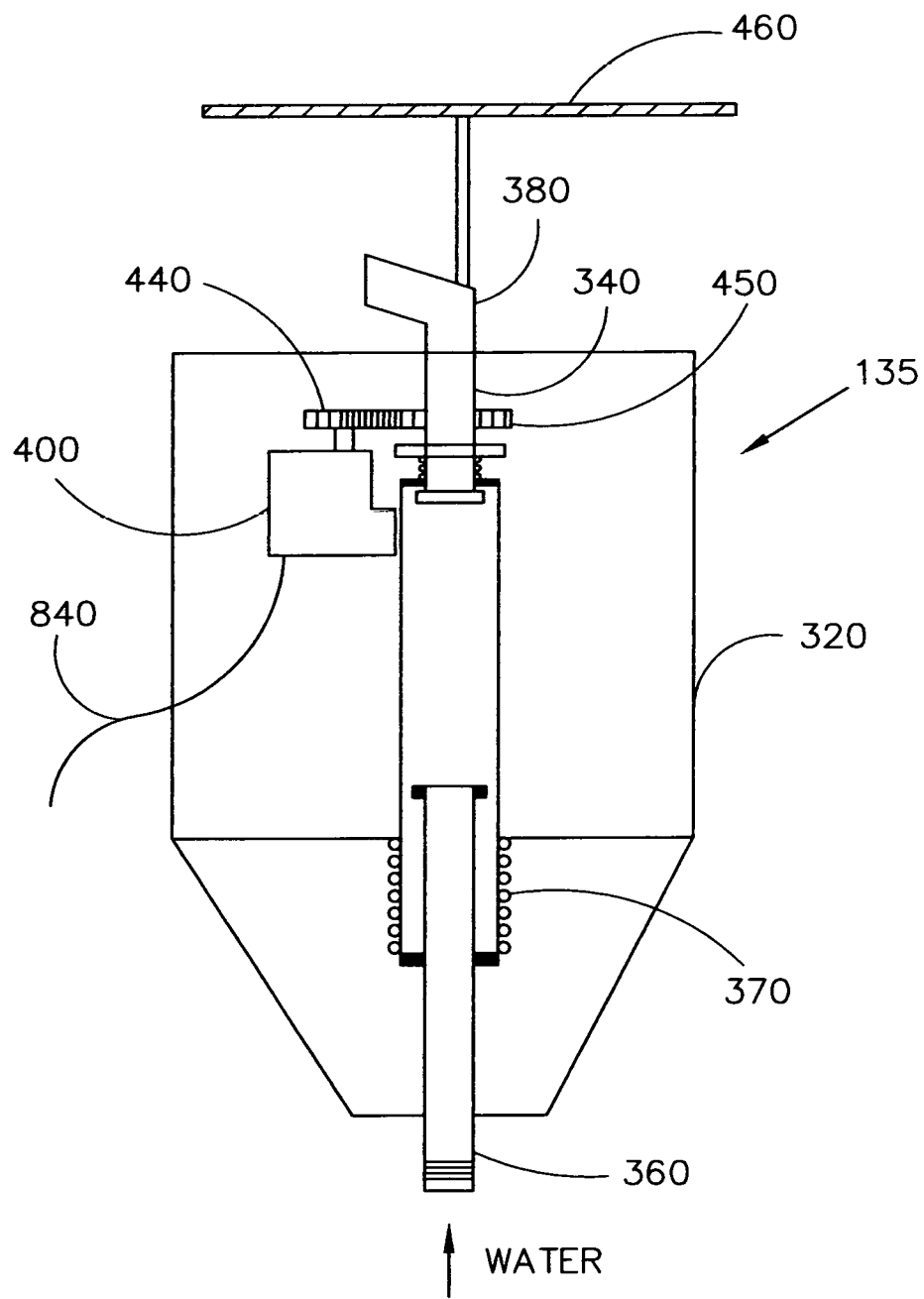
FIG. 21 is a side view of the enclosed apparatus with a single position-controlled motor for controlling the direction of the sprinkler nozzle.

FIG. 21 shows one embodiment of an enclosed nozzle apparatus 135. In this embodiment, the design is similar to an impact rotor sprinkler except in this embodiment, the nozzle is controlled by a position-controlled motor 400 instead of by pulsating water. The water is received via an inlet 360 and pushes up the pipe. The pressure of the water retracts the spring 370 and raises the nozzle 380 above ground which has a cover 460 to prevent debris from entering the unit while not in use. The water is injected out of the nozzle 380. The direction of the nozzle 380 is controlled via the position-controlled motor 400 and gears 440 and 450. The gear 450 is attached to the pipe 340 which is attached to the nozzle 380. As the control information is transmitted across wire(s) 840, the position-controlled motor 400 responds to the control information and drives the nozzle 380 in the desired direction. The enclosure 320 covers the components from debris. Position-controlled motor 400 is similar to the position-controlled motor 36 as described earlier.

Figure 22A:
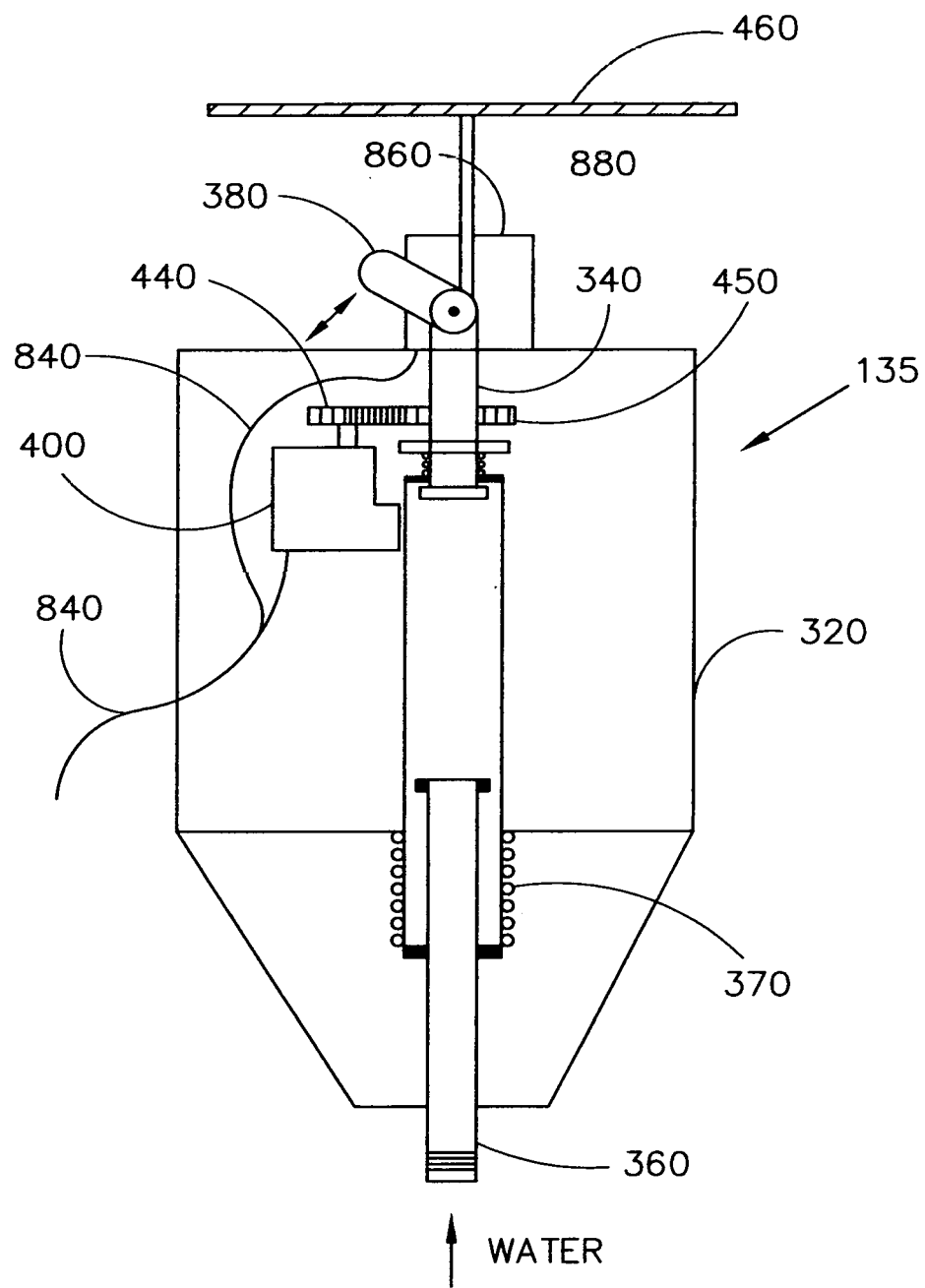
FIG. 22A is a side view of the enclosed apparatus with a position-controlled motor for controlling the direction of the sprinkler nozzle and an additional position-controlled motor for controlling the angle from horizontal.

FIG. 22A shows two position-controlled motors 400 and 860. Position-controlled motor 400 controls the direction of the water stream in horizontal plane, and the position-controlled motor 860 controls the angle of nozzle 380 via gears 880. With both position-controlled motors 400 and 860, the water stream can be directed at any area.

Figure 22B:
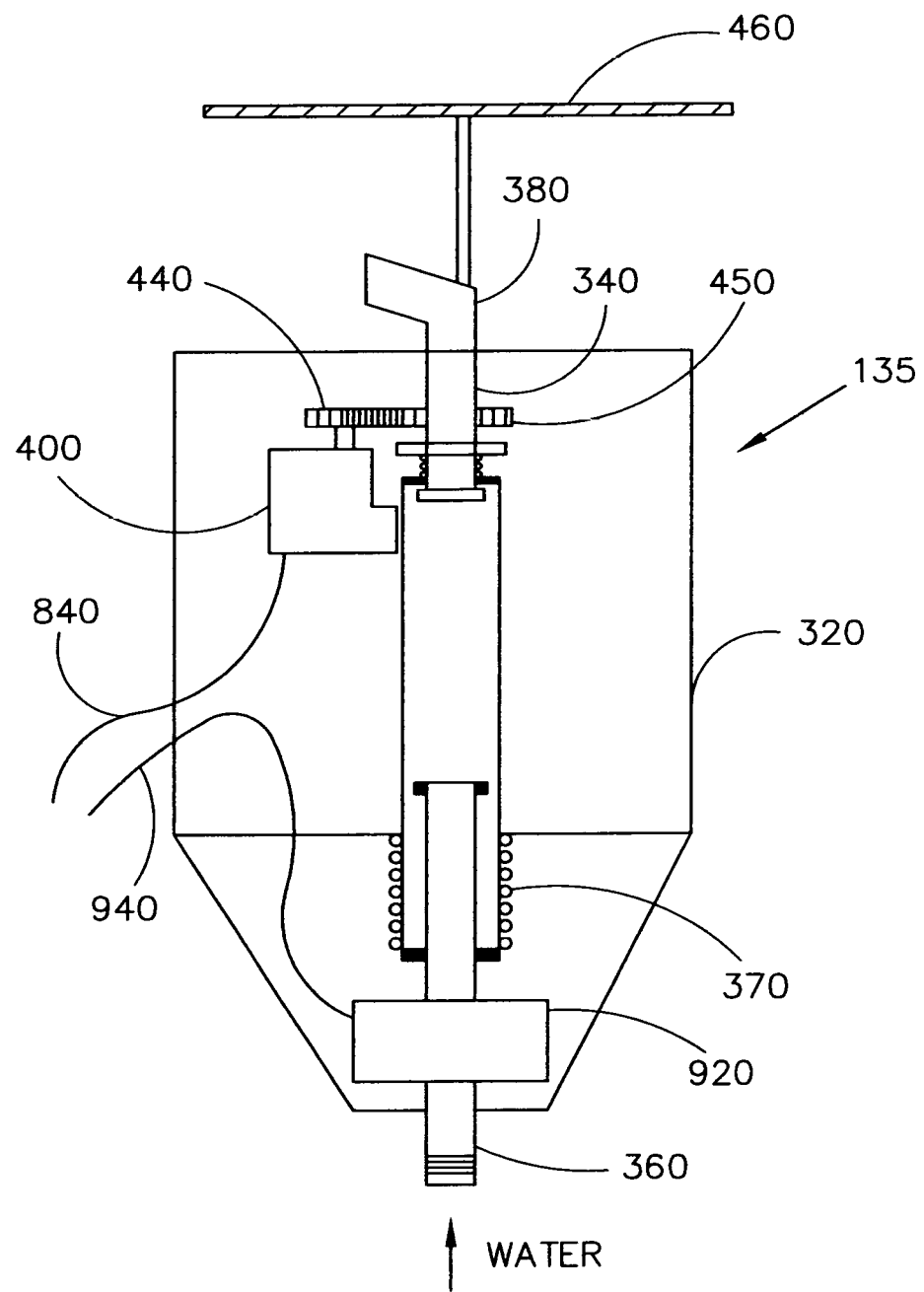
FIG. 22B is a side view of the enclosed apparatus with a position-controlled motor for controlling the direction of the sprinkler nozzle and an additional valve for controlling the flow rate.

FIG. 22B shows another embodiment in which the internal valve 920 controls the water flow. The position-controlled motor 400 controls the direction of the water stream in horizontal direction via gears 440 and 450, and the electrical wires 940 controls the flow rate via the valve 920.

Figure 22C:
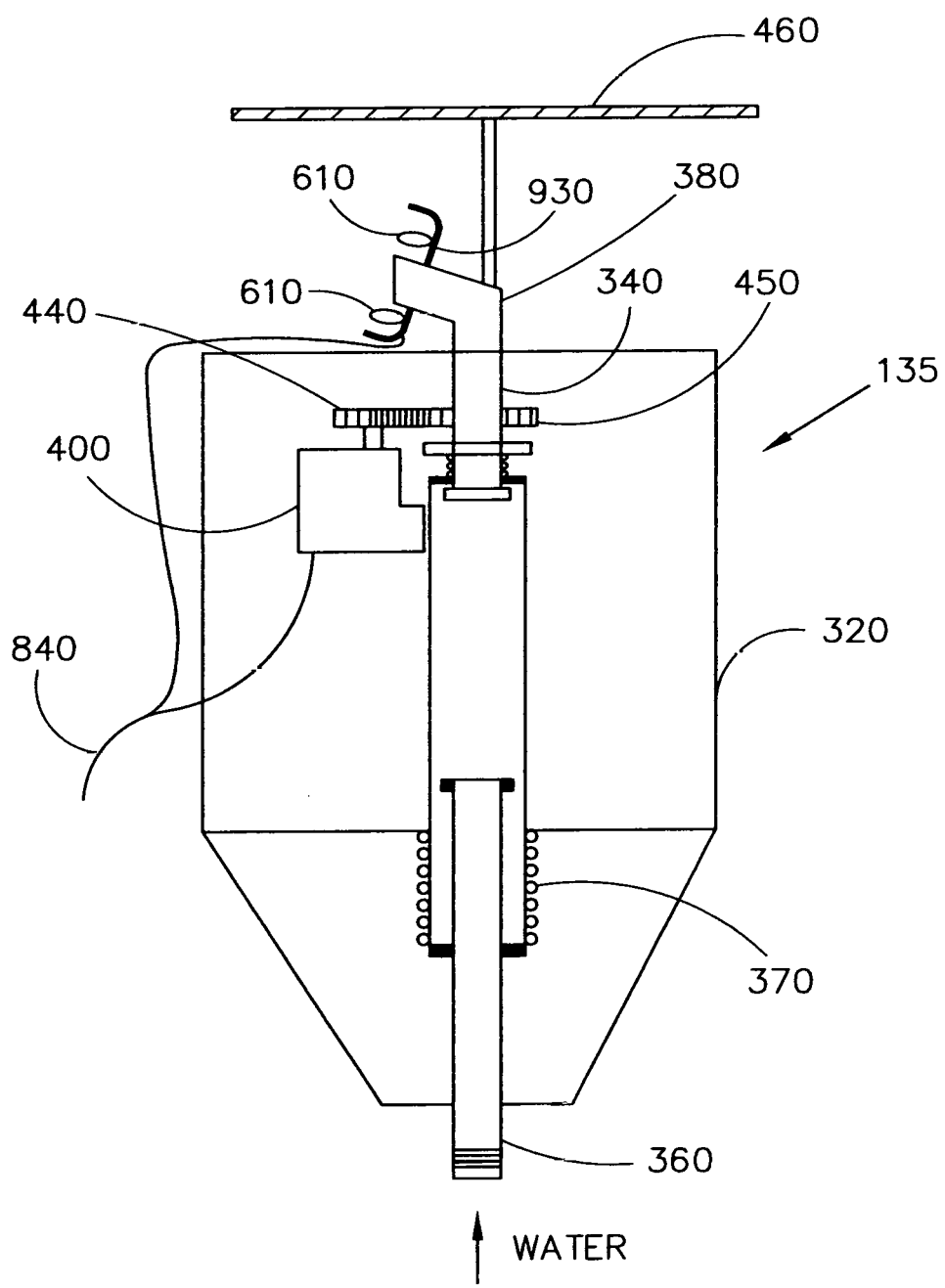
FIG. 22C is a side view of the enclosed apparatus with a position-controlled motor for controlling the direction of the sprinkler nozzle and a nozzle attachment with attached lights.

FIG. 22C shows another embodiment which contains lights 610 attached to a mounting ring 930 around the nozzle 380. These lights can be LEDs, lasers, or incandescent lights and are controlled by the line 840 along with the position-controlled motor 400.

Figure 22D:
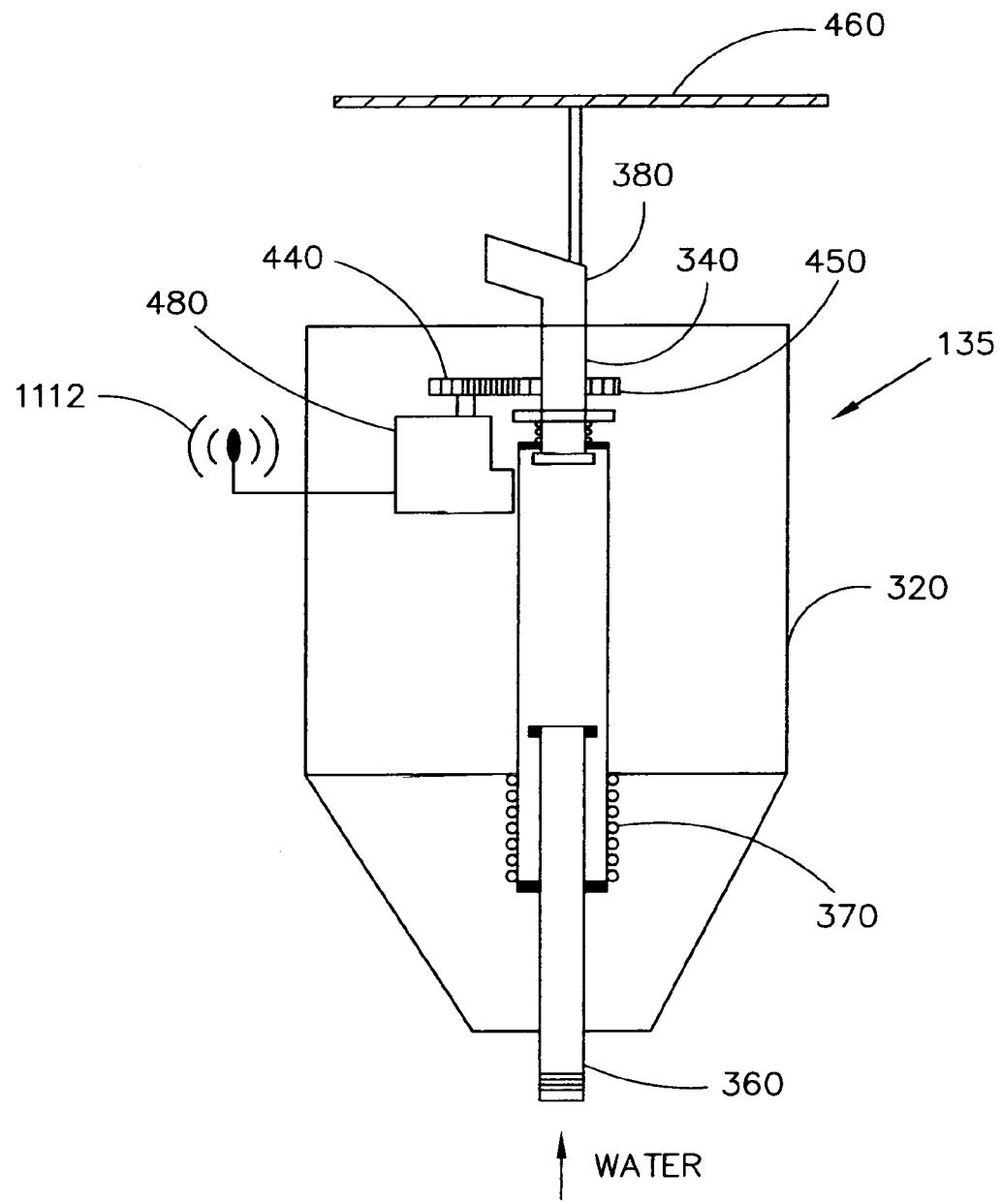
FIG. 22D is a side view of the enclosed apparatus with a position-controlled motor for controlling the direction of the sprinkler nozzle using a wireless connection.
Figure 23:
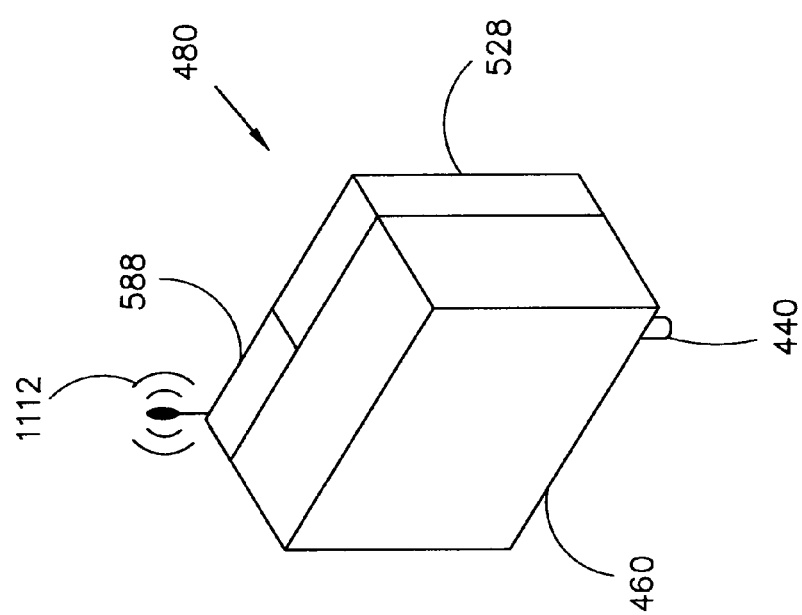
FIG. 23 is a block diagram of the remote control component of FIG. 22D.

FIG. 22D shows another embodiment which contains the position-controlled motor connected to a receiver denoted as combination unit 480. FIG. 23 shows the combination unit 480 which contains the position-controlled motor 460 with output shaft 440, a receiver 588, and electrical power source 528 such as a battery. In this embodiment, the nozzle apparatus is controlled via radio signals 1112 via a wireless communication link.

Figure 24A:
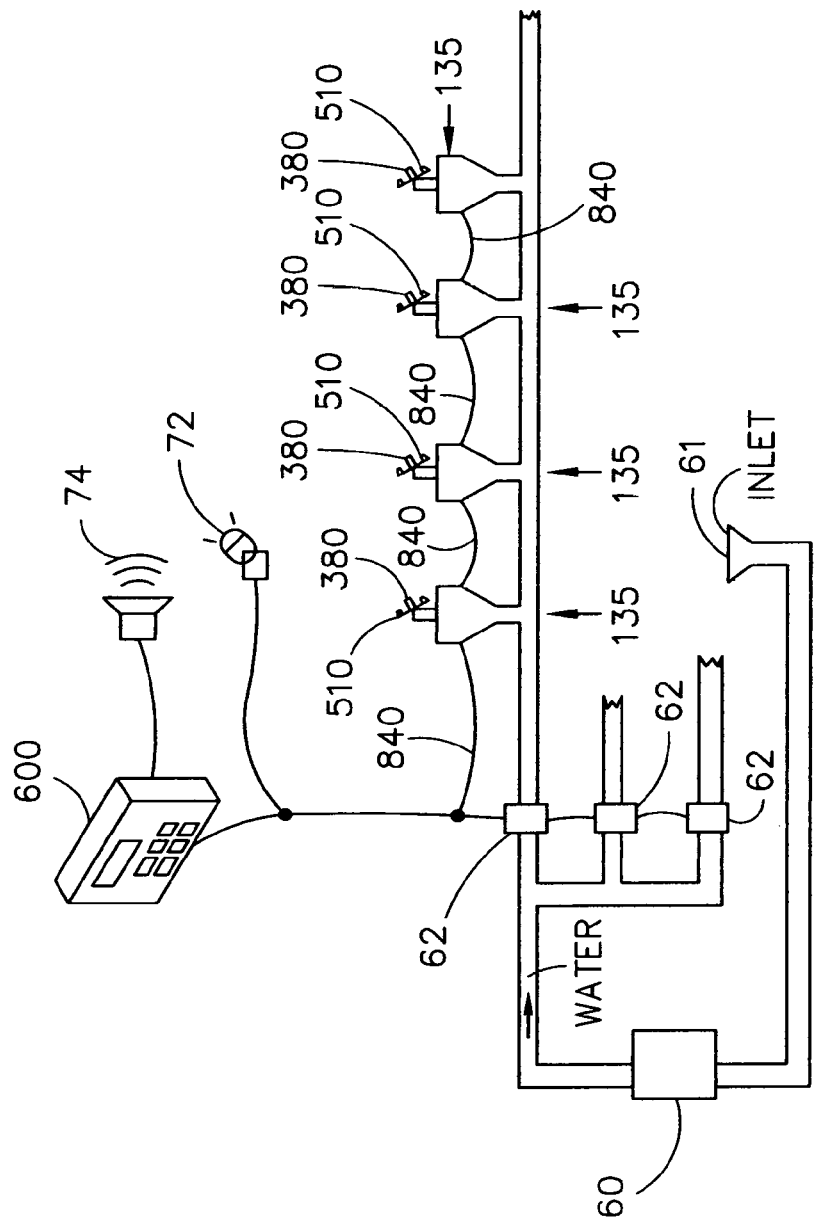
FIG. 24A is a pictorial diagram of the fountain system with enclosed apparatuses controlled by a dedicated computer.

FIG. 24A shows a similar embodiment as shown in FIG. 18 except the nozzle apparatus are the enclosed nozzle apparatuses 135 arranged in a distributive system, rather than the nozzle apparatuses 35. Both embodiments of the nozzle apparatus can be used in the different configurations as shown in the examples described herein.

Figure 24B:
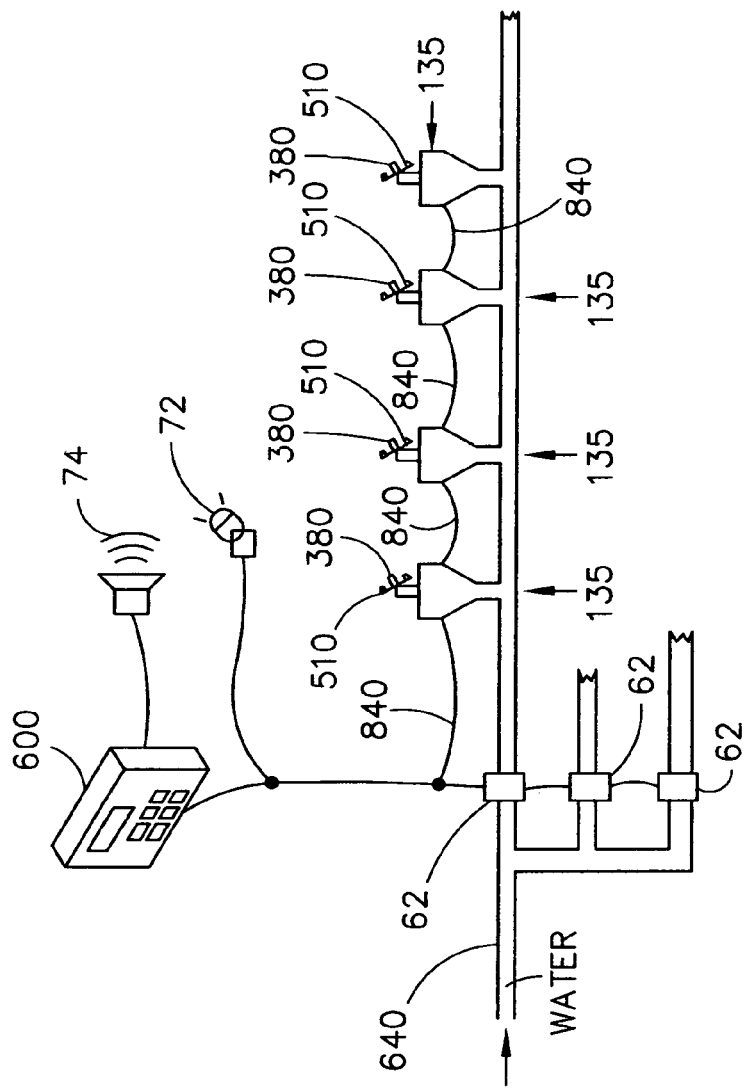
FIG. 24B is a pictorial diagram of the sprinkler system with enclosed apparatuses controlled by a dedicated computer.

FIG. 24B shows the enclosed nozzle apparatuses 135 in a distributive system that is used in a sprinkler system where inlet water is attached to a water supply 640 and the enclosed nozzle apparatuses 135 are sprinkler nozzle apparatuses.

Figure 25:
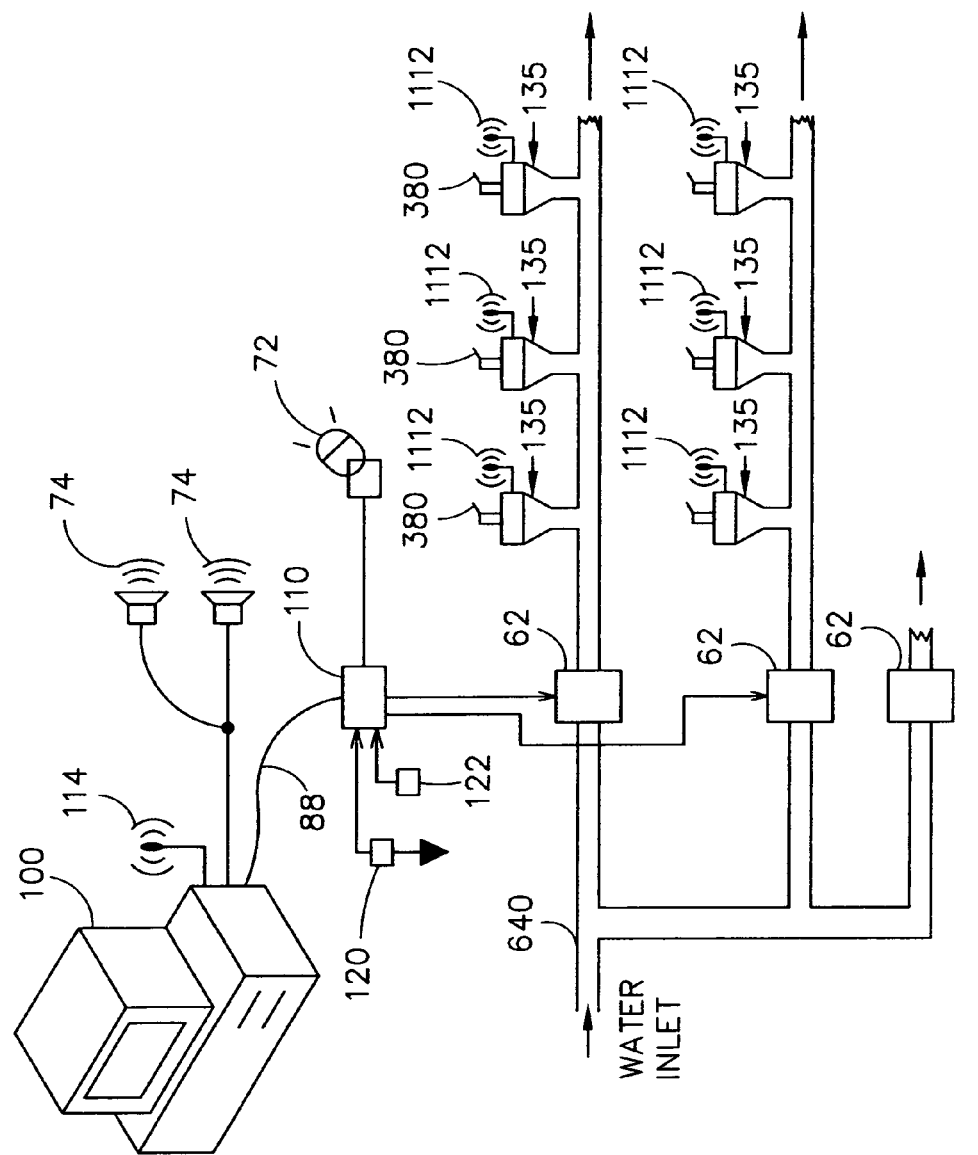
FIG. 25 is a pictorial diagram of the sprinkler system with enclosed apparatuses controlled by a computer and converter.

In FIG. 25, a computer 100 controls the speakers via the onboard audio card (standard with the majority of PCs and Laptops) and controls the other devices via the converter 110. In this configuration, the devices are wired directly to the converter 110. Devices such as valves 62, enclosed sprinkler nozzles 135, and the device 122 are wired to the converter 110. The Converter 110 may be connected to the computer 100 via the electrical wires 88 such as USB. The computer 100 contains the software program which controls the devices in time with the music such as by use of a MIDI Sequencer as stated earlier. Other programs are available that can provide a proprietary protocol or other standard protocols such as DMX. Besides controlling devices, the converter 110 reads the sensor devices 122 and 120 and inputs the information to the computer 100. The computer 100 via the software program utilizes the sensor information to water certain areas more via the program or to spray an intruder. Sensor 122 can be a rain detector, a moisture sensor, a motion detector, a solar sensor, a light detector, an infrared camera, etc. Each sensor would provide a different capability of the system. For example, the rain detector would prevent watering the lawn or field in the rain. The moisture detector would determine where the water is needed the most. The solar or light detector would turn on the lights 72 at night automatically. A motion sensor or infrared camera would detect a trespasser and orient the sprinklers at the intruder or animal to scare it off.

Figure 26:
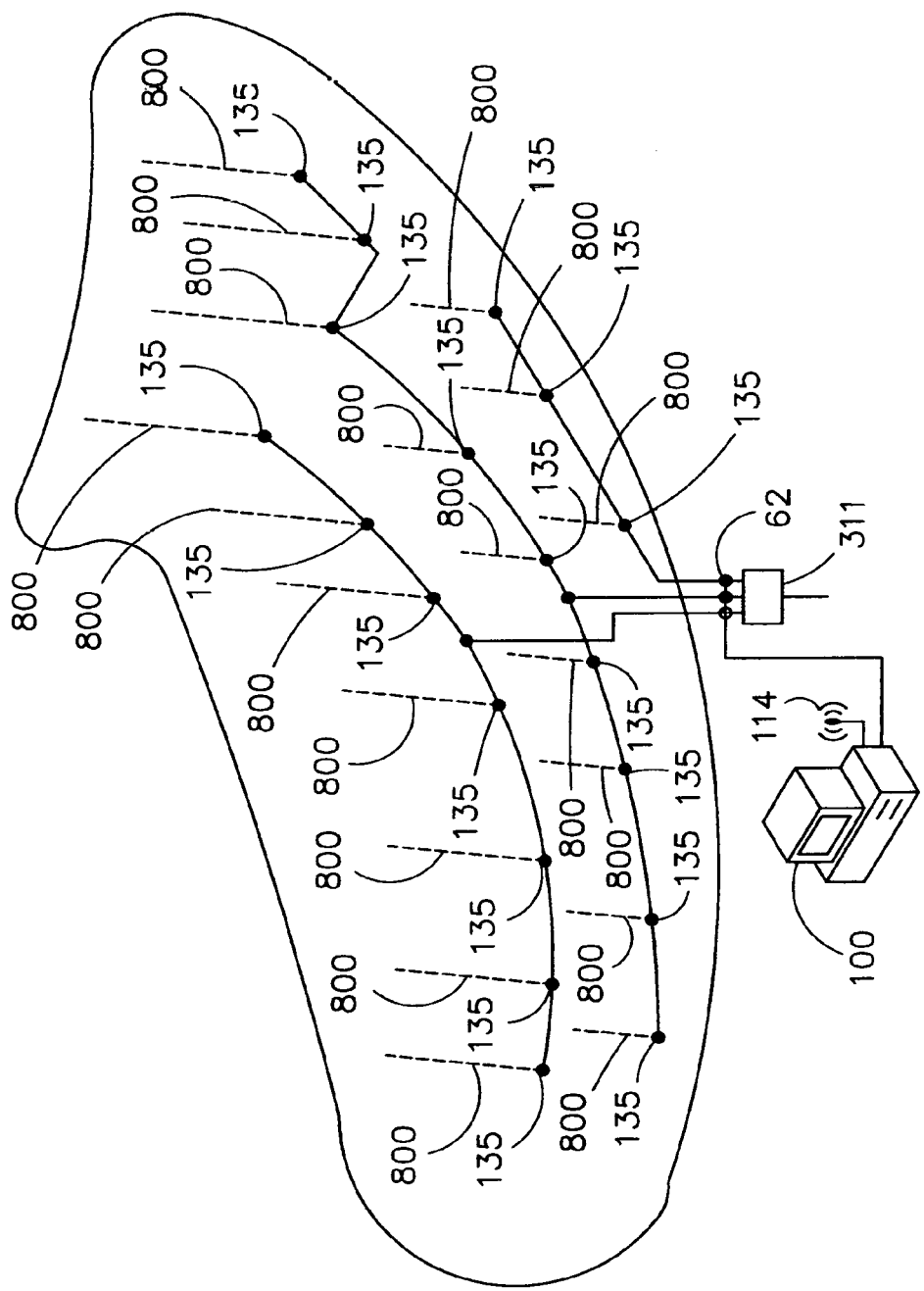
FIG. 26 is a pictorial view of a sprinkler system with enclosed apparatuses installed in a large area such as a golf course.

FIG. 26 shows one application of the invention installed on a golf course. The irrigation system has three zones with many enclosed nozzle apparatuses 135. Each enclosed nozzle apparatus 135 provides a spray pattern 800 and is wirelessly controlled by the computer 100. The valves 62 are also controlled by the computer. The housing 311 provides the water to the three zones. As illustrated, if the spray patterns 800 are synchronized with the music from the speakers 74, an entertainment effect is achieved in addition to watering the golf course.

Figure 27:
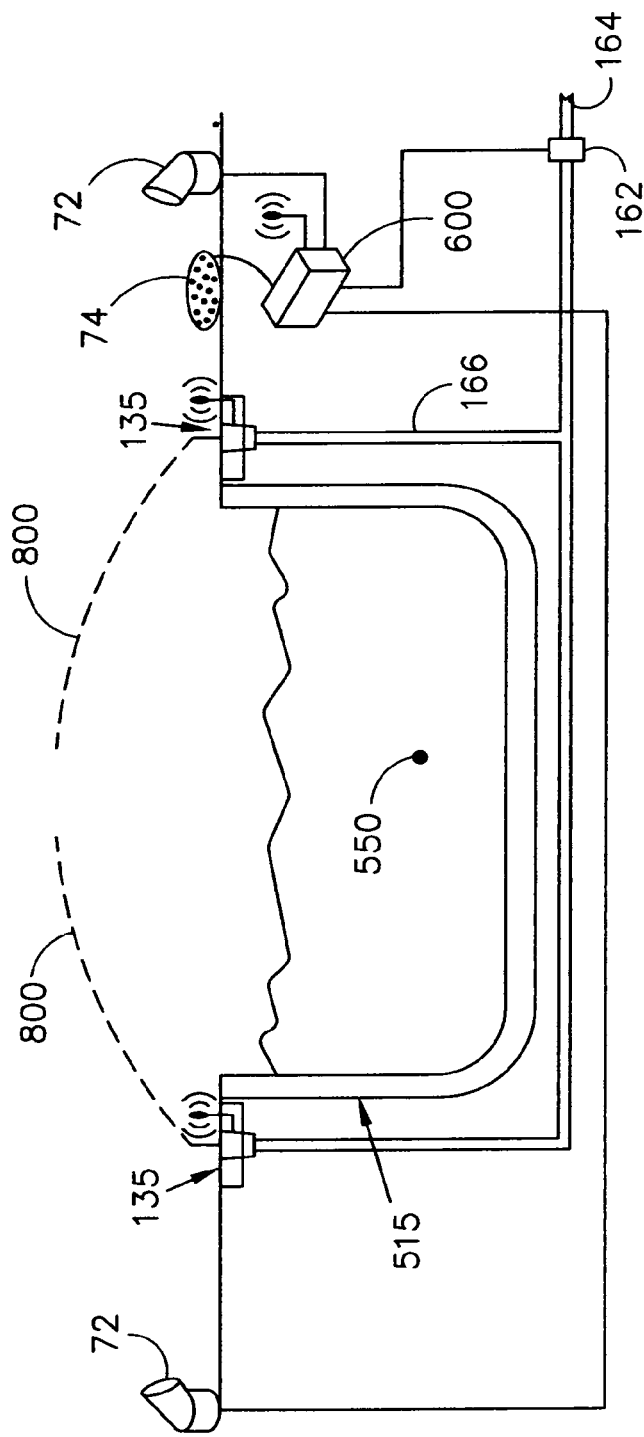
FIG. 27 is side view of a pool system with enclosed apparatuses and a dedicated computer.

FIG. 27 shows another embodiment where the nozzle apparatus 135 are used as around a water pool, 515 in a distributive manner. In FIG. 27, the enclosed nozzle apparatuses 135 are located around the water pool and connected via a pipe 164 to either the water supply or re-circulation pump. An inlet pipe 166 is connected after valve 162, which is controlled by controller 60. The controller 60 also controls lights 72 and 73 along with the fountain apparatus position the water streams 800 over the water 550. As the music plays through the speaker 74, the enclosed nozzle apparatus 135 are synchronized together with the music to provide a water show.

The software, data patterns, and the like illustrated and described herein can exist in a variety of forms both active and inactive. For example, software can exist partially or wholly in the form of source code, object code, executable code or other formats. Any of the above can be embodied in compressed or uncompressed form on a computer-readable medium, which include storage devices. Exemplary computer-readable storage devices include conventional computer system RAM (Random Access Memory), ROM (Read Only Memory), EPROM (Erasable, Programmable ROM), EEPROM (Electrically Erasable, Programmable ROM), flash memory and magnetic or optical disks or tapes.

The terms and descriptions used above are set forth by way of illustration only and are not meant as limitations. Those skilled in the art will recognize that those and many other variations, enhancements and modifications of the concepts described herein are possible without departing from the underlying principles of the invention. The scope of the invention should therefore be determined only by the following claims and their equivalents.

I claim:

1. A fountain system comprising:
   a plurality of position-controlled nozzles, that control the direction of a liquid stream coming from each nozzle, wherein each position-controlled nozzle is controlled by a hobby servo attached to each nozzle;
   a free-form water structure which surrounds the liquid stream coming from the plurality of nozzles;
   a re-circulating pump contained in the free-form water structure that supplies a liquid to the plurality of position-controlled nozzles via position-controlled motor valves; and
   a portable computer configured to synchronize motion of said nozzles via said hobby servo and the liquid flow from the nozzles via said position-controlled motor valves with a choreographed program.

2. A fountain system according to claim 1 wherein the portable computer comprises a laptop, PC, a dedicated computer, or an embedded computer.

3. A fountain system according to claim 1 wherein the choreographed program comprises control of said nozzles and said valves synchronized to music.

4. A fountain apparatus comprising:
   a plurality of directional nozzles that control the respective directions of respective liquid streams coming from each nozzle, wherein the nozzles' flow rate is controlled by an electric motor connected to the nozzles; and
   a wireless transceiver, included in a converter that supplies to said electric motor one or more signals based on one or more patterns received from a poi table computer via a wireless two-way communication link, wherein the portable computer executes a choreographed control program to control the flow rate through the nozzles.

5. A fountain apparatus according to claim 4 wherein the fountain apparatus is an ornamental fountain apparatus, a spa fountain apparatus, or a pool fountain apparatus.

6. A fountain apparatus according to claim 4, further comprising a sound system, wherein the portable computer is capable of producing music synchronized with the nozzles' flow rate.

7. A fountain apparatus according to claim 4, wherein the portable computer further executes a MIDI (Musical Instrumental Digital Interface) sequencer to control two or more of music, lights, valves, pump, or nozzles in the fountain apparatus.

8. A method of operating a plurality of fountain nozzles that emit pressurized water from a re-circulating pump in a fountain, the method comprising:
   creating an electric signal encoding flow rate information choreographed to music stored on a portable computer; and
   providing said electric signal to and from said portable computer using a wireless connection and a converter providing an electric signal to an electric motor fluidly connected to the nozzles, thereby controlling the flow rate from the nozzles.

9. A method according to claim 8, further comprising:
   playing music in coordination with the flow rate from the nozzle.

10. A method according to claim 8, further comprising:
    illuminating one or more lights in coordination with the flow rate from the nozzle.

* * * * *